(12) United States Patent
Pecher

(10) Patent No.: US 7,716,018 B2
(45) Date of Patent: May 11, 2010

(54) METHOD AND COMPUTER PROGRAM FOR DETERMINING OPERATING PARAMETERS IN A ROLLER BEARING AND A ROLLER BEARING WHICH MAY BE ANALYZED

(75) Inventor: Alfred Pecher, Stadtlauringen (DE)

(73) Assignee: Schaeffler KG, Herzogenaurach (DE)

( * ) Notice: Subject to any disclaimer, the term of this patent is extended or adjusted under 35 U.S.C. 154(b) by 579 days.

(21) Appl. No.: 11/570,158

(22) PCT Filed: Jun. 8, 2005

(86) PCT No.: PCT/EP2005/006143

§ 371 (c)(1),
(2), (4) Date: Jun. 29, 2007

(87) PCT Pub. No.: WO2005/121809

PCT Pub. Date: Dec. 22, 2005

(65) Prior Publication Data

US 2008/0091361 A1    Apr. 17, 2008

(30) Foreign Application Priority Data

Jun. 8, 2004    (DE) .................... 10 2004 027 800

(51) Int. Cl.
*F16C 32/00* (2006.01)
(52) U.S. Cl. ...................................... 702/190
(58) Field of Classification Search .................. 702/190
See application file for complete search history.

(56) References Cited

U.S. PATENT DOCUMENTS 4,198,677 A    4/1980 Brunner et al.
5,952,587 A    9/1999 Rhodes et al.
2001/0043151 A1    11/2001 Draxelmayr
2002/0047683 A1*    4/2002 Kawashima ................ 318/721

FOREIGN PATENT DOCUMENTS

| DE | 101 36 438 A | 3/2002 |
| DE | 101 36 438 Y | 3/2002 |
| EP | 0685705 Y | 12/1995 |
| JP | 06058772 | 6/1994 |
| WO | 2004/070340 P | 8/2004 |

* cited by examiner

Primary Examiner—Tung S Lau
(74) Attorney, Agent, or Firm—Lucas & Mercanti, LLP

(57) ABSTRACT

The invention relates to a method and a computer program for determining operating parameters such as, in particular, the rotational speed, the rotational direction, the radial force, the axial force or of structural sound events of a rotating roller bearing to which a sensor arrangement is fixed which, on rotation of the roller bearing delivers a sinusoidal signal, depending on its rotational position, which is sampled at sampling points k, k+1, k+2, . . . To determine the rotational speed, the rotational direction, the radial force and/or the axial force, a mean value is determined by means of estimation and the operating parameters are determined on the basis of a corrected signal which does not obtain an offset by subtraction of the estimated mean value from the sensor signal. To determine structural sound events, the sensor signals are filtered in a high-pass filter and structural sound occurring is determined by estimating a statistical moment of at least the second order. The invention also relates to a roller bearing which is provided with an evaluating device for carrying out the method.

24 Claims, 14 Drawing Sheets

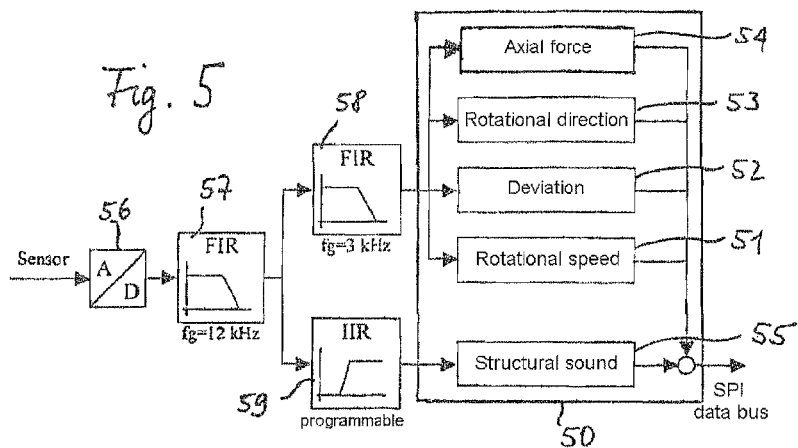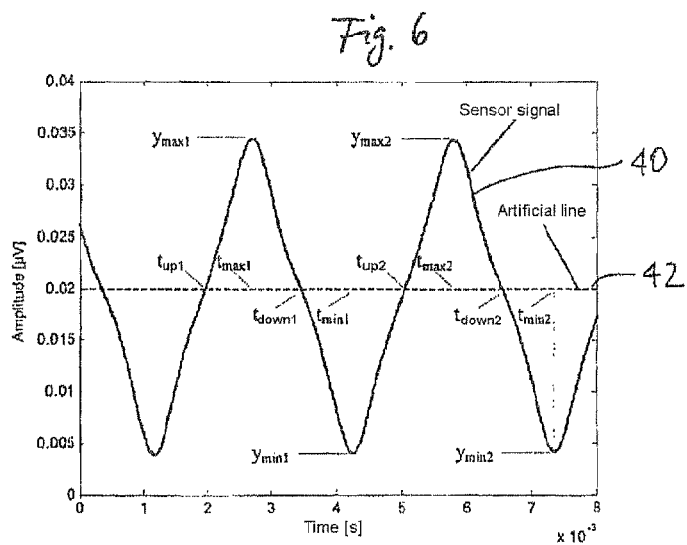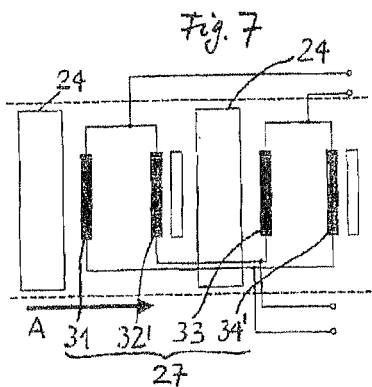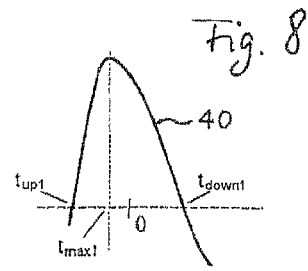

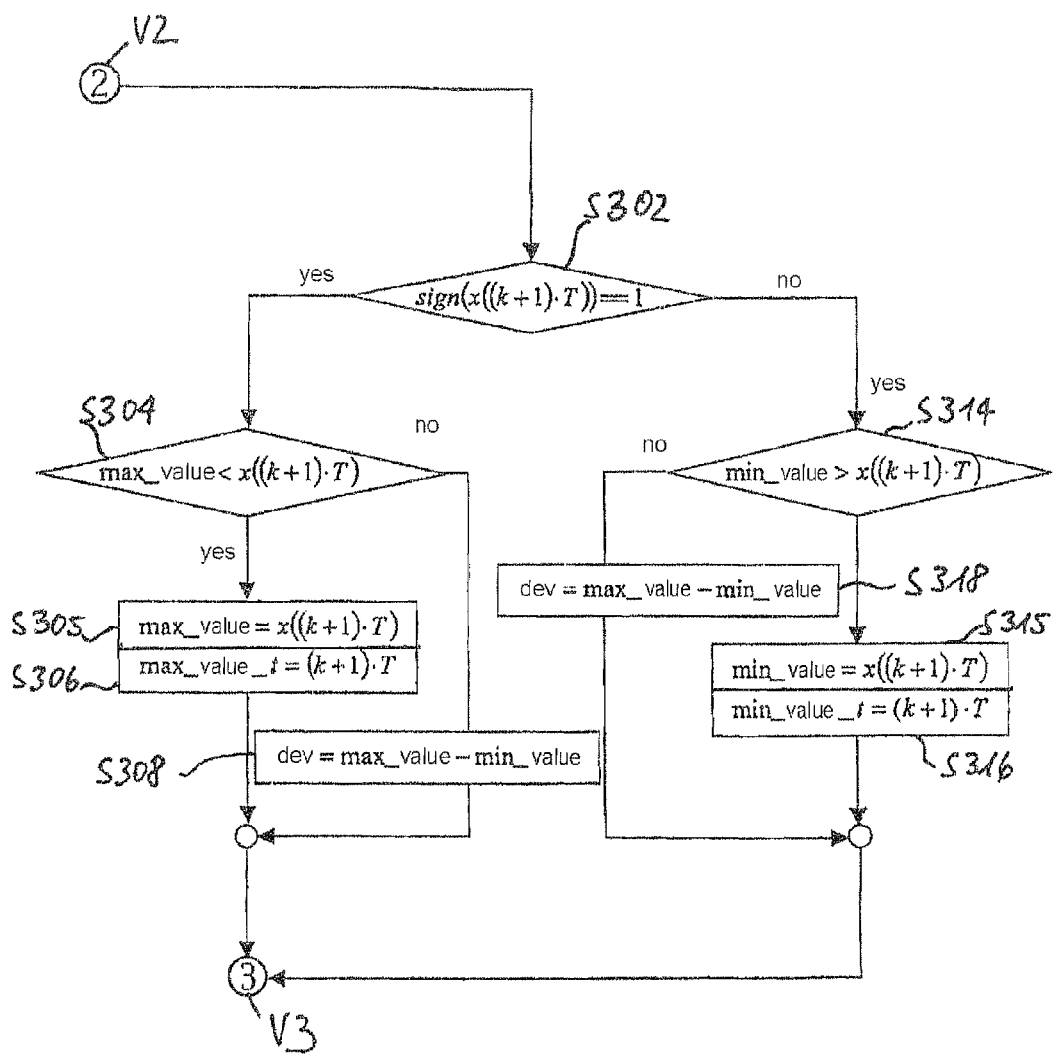

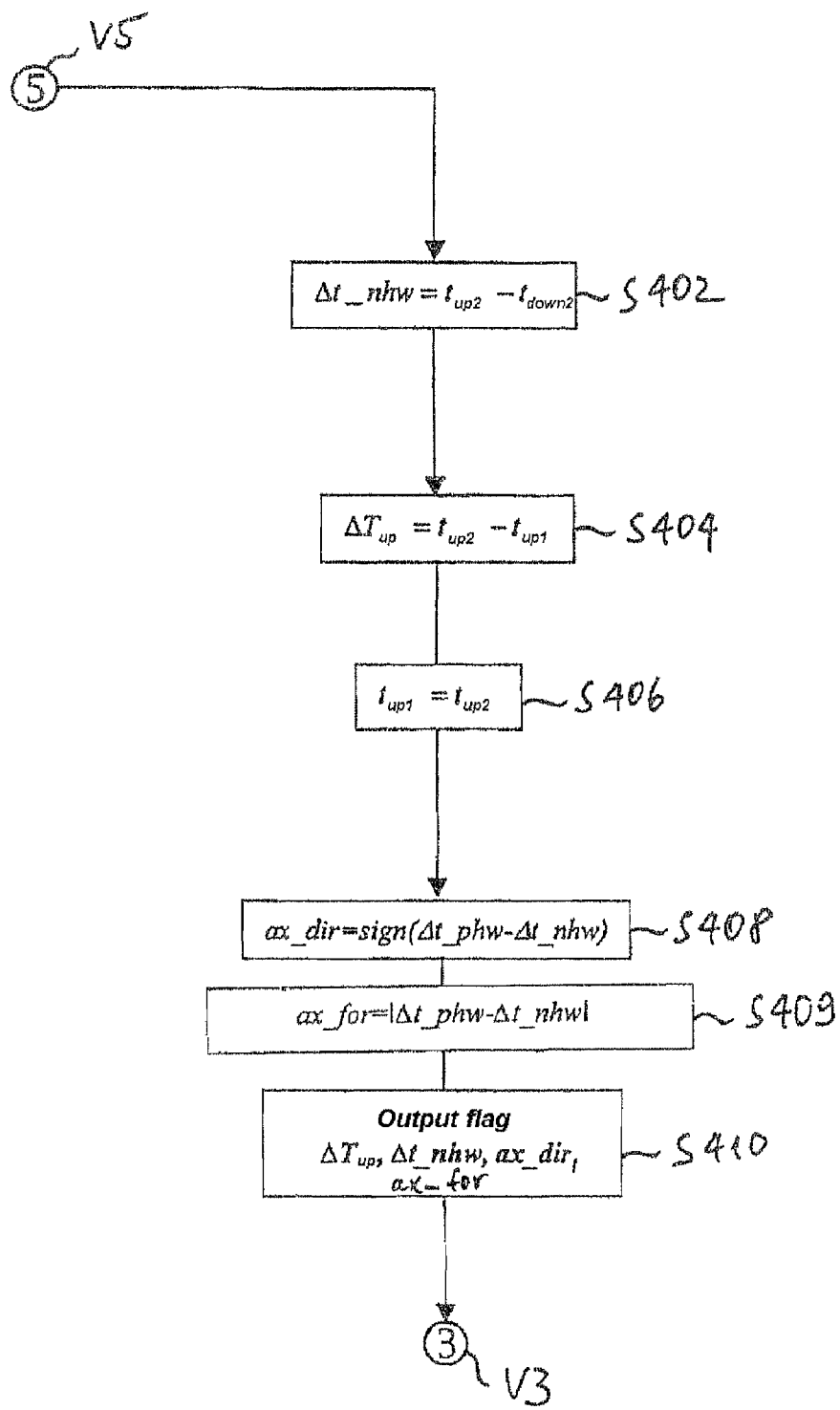

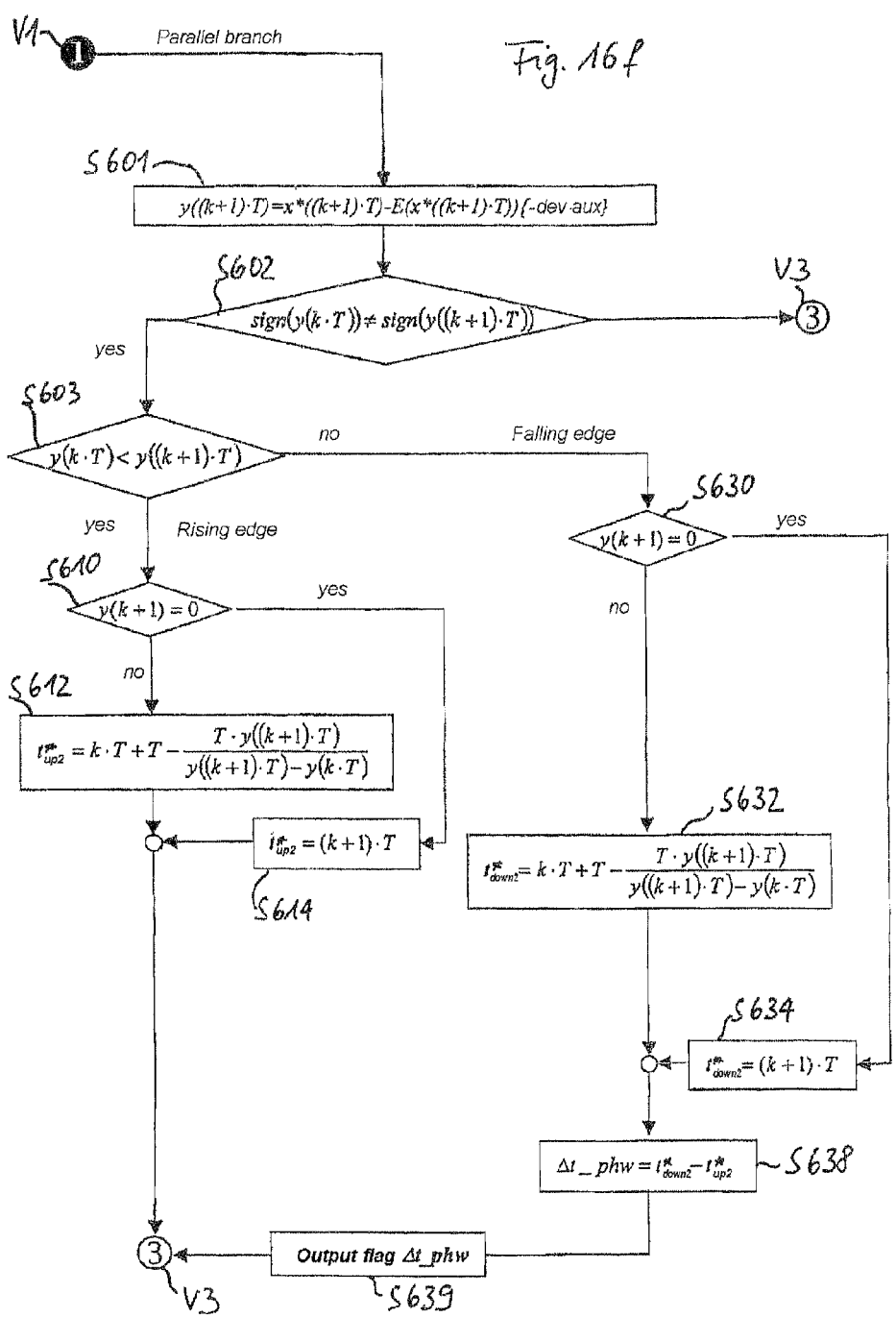

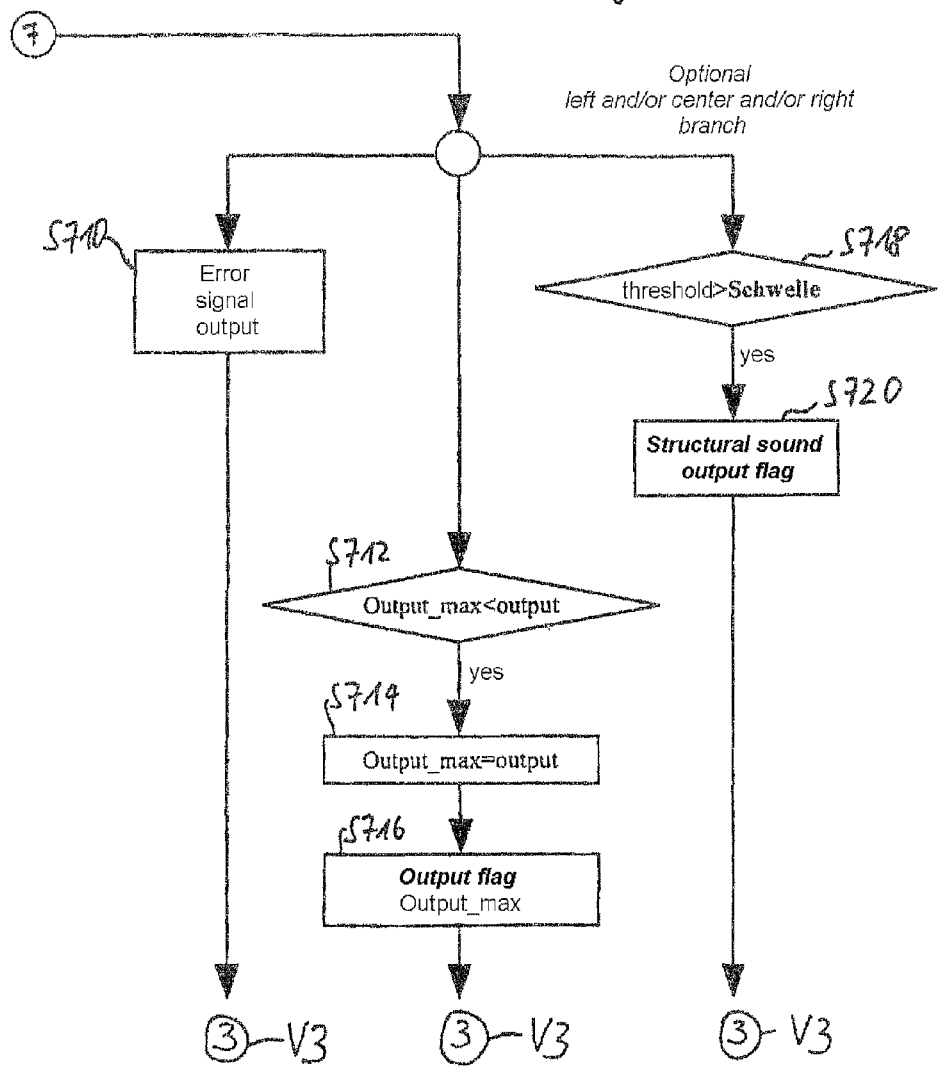

Figure 1:
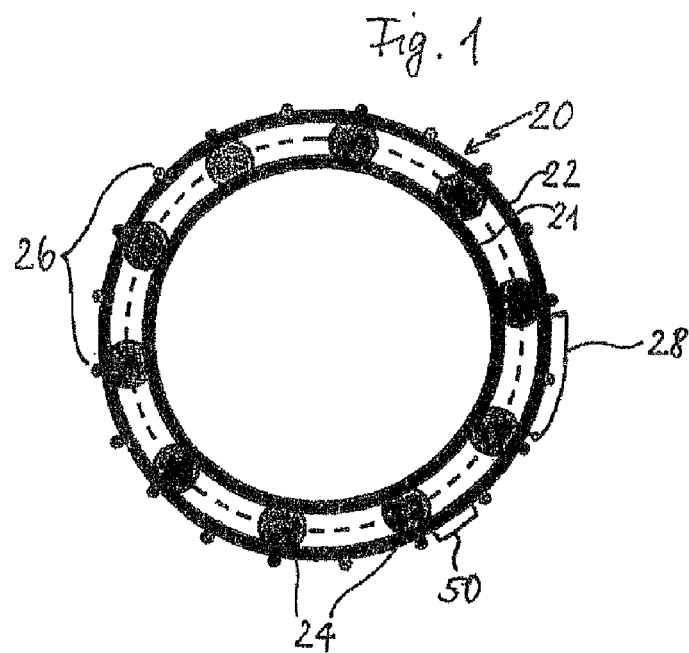

METHOD AND COMPUTER PROGRAM FOR DETERMINING OPERATING PARAMETERS IN A ROLLER BEARING AND A ROLLER BEARING WHICH MAY BE ANALYZED

The present invention relates to a method and a computer program product (also called computer program or software in short) according to claim 1 and 19, respectively, for determining operating parameters in a roller bearing and a roller bearing according to claim 20 which may be analyzed with the aid of the aforementioned method.

Roller bearings are used in every machine in the industrial field. Due to the continuously increasing demands on the service life and the operational reliability of such machines, there is an increasing requirement for detecting individual operating parameters such as, for example, the rotational speed, the rotational direction, forces acting on the bearing in the axial and radial direction and noise in the bearing which are generally called structural sound events, in order to be able to derive from these, among other things, indications of possibly critical situations for the bearing and/or the machine.

In principle, there are some possibilities for finding the necessary automated method for determining initially rotational speed and force. Thus, for example, the local extremes could be found by differentiating the curve and looking for the zero points of the first derivation. From this, the times of the occurrence of an extreme can be read which, in turn, produces the function value of the original curve at the corresponding time. However, it must be expected that noise sources are superimposed on the sensor signal so that the approach via differentiation does not lead to a useful result. In addition, according to this method, values of the signal variation would have to be temporarily stored. Such problems are frequently also solved by detecting the local maxima and minima of the curve by displacing a window, having a width adapted to the signal frequency, in time. However, this method is only applicable if the frequency remains constant or changes only slowly in order to be able to readjust the window width correspondingly. When used in a bearing, the rotational speed changes are too fast so that such an approach must be disregarded from the start.

Spectral evaluating methods for determining the signal frequency and the rotational speed to be inferred from this are also unsuitable for the application since the real-time characteristic is lost due to Fourier transformation or fast Fourier transformation and the temporal averaging contained therein, since fluctuations in the frequency can no longer be detected. In addition, a considerable number of function values of the curve must be temporarily stored here in order to achieve the necessary spectral resolution.

The difficulty is, therefore, that the available methods for calculating these operating parameters, due to the high amounts of data, the storage capacity required for these amounts of data and the necessary computing power, can only be carried out in external computers, that is to say not locally in a chip in the roller bearing itself. There is also the problem that the multiplicity of data lines required for transporting the detected roller bearing data to the outside to the external computer can only be accommodated with difficulty in a small roller bearing.

The problem of the data lines can be solved by integrating sensor system and evaluating electronics in the form of a number of sensors with associated microcomputers in the vicinity of the roller bearing, possibly even in the roller bearing itself, i.e. by means of a so-called IQ bearing. This makes the demands to the development particularly high in as much as this local integration of sensor system and evaluating electronics are to be performed without changing the external geometric shape of the bearing. Naturally, this also increases the requirements for the microelectronic components due to the increased environmental influences of temperature, of lubricants and coolants and the necessary small constructional size of the required hardware components. In particular, the functional integration by the necessary method represents a particular challenge due to the small constructional size of the microprocessors since, due to the resultant restricted computing capacity only a limited tool is available for evaluating the data supplied by the sensor and, nevertheless, reliable determination of the operating parameters of the bearing is demanded.

The result of the aforementioned considerations is that memories must largely be omitted from the planned application and, accordingly, the development of the method must also be adapted to the geometric situations not only with respect to computing operations which are as simple as possible but also with respect, in particular, to the number of gates necessary for temporarily storing data.

The present invention is based on the object of creating a method for determining operating parameters in a roller bearing which is as efficient as possible but reliable and which is intended to provide the possibility of being carried out in an electronic circuit which is located in the vicinity of the roller bearing and preferably in the roller bearing itself, and the method should also be implementable as a computer program. Furthermore, a roller bearing is to be created which can be connected or is connected to an evaluating device in which the operating parameters are determined efficiently and reliably.

This object is achieved by means of a method according to claim 1 and, respectively, by means of a computer program according to claim 19 and a roller bearing according to claim 20. Advantageous embodiments of the invention are the subject matter of the dependent claims.

The method according to the invention according to claim 1 and the computer program according to the invention according to claim 19 can be integrated in a very small space in an electronic circuit or a chip even in the roller bearing itself, responds "intelligently" to dynamic changes in the roller bearing and is capable of determining the operating parameters with high accuracy.

The roller bearing according to the invention according to claim 20 comprises an evaluating device by means of which the methods according to claims 1 to 18 or, as an alternative, the computer program according to claim 19, which can be stored on a storage medium (e.g. RAM, ROM, CD, DVD, floppy disk, hard disk, flash memory etc.) and/or can be called up by a network, can be carried out. This takes into consideration that the evaluating device preferably constructed as ASIC in a chip only has limited computing capacities in its size due to the placement in the slot of the outer ring. In this arrangement, the width of the chip is determined a priori by the width of the outer ring of the bearing. In addition, the chip is not too long in the circumferential direction of the outer ring since otherwise the chip located in the slot would be bent excessively due to the curvature of the outer ring and thus a defect would threaten. Due to the limited chip area, the mathematical or signal-related possibilities which can be achieved by the chip are greatly limited, but are completely sufficient for carrying out the method according to the invention. In particular, no evaluating methods are used which depend on the temporary storage of a relatively large amount of signal values.

Figure 2:
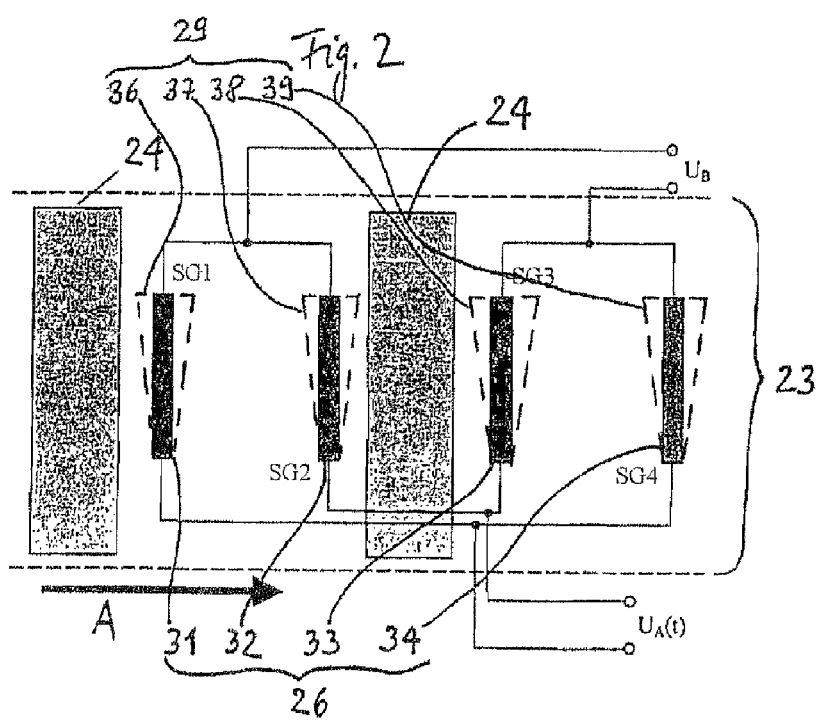
Figure 3:
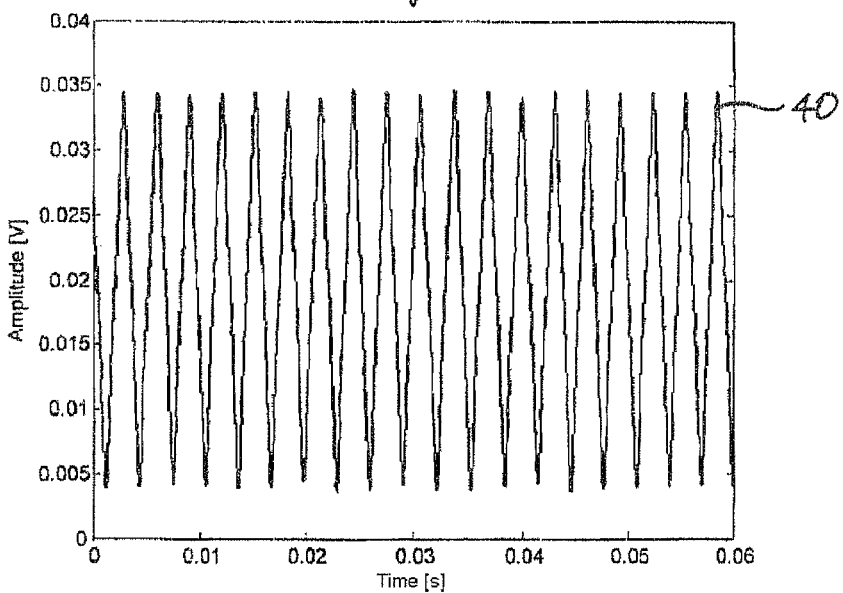
Figure 4:
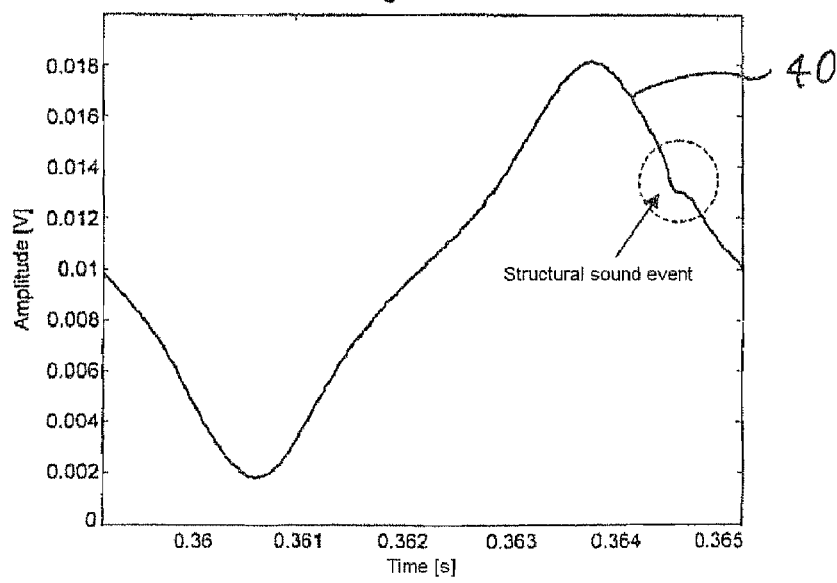
Figure 9:
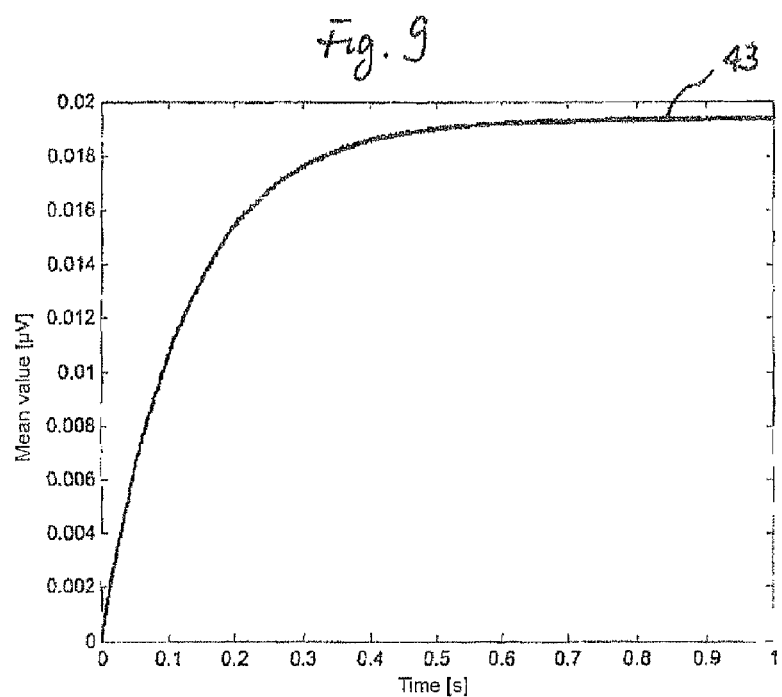
Figure 10:
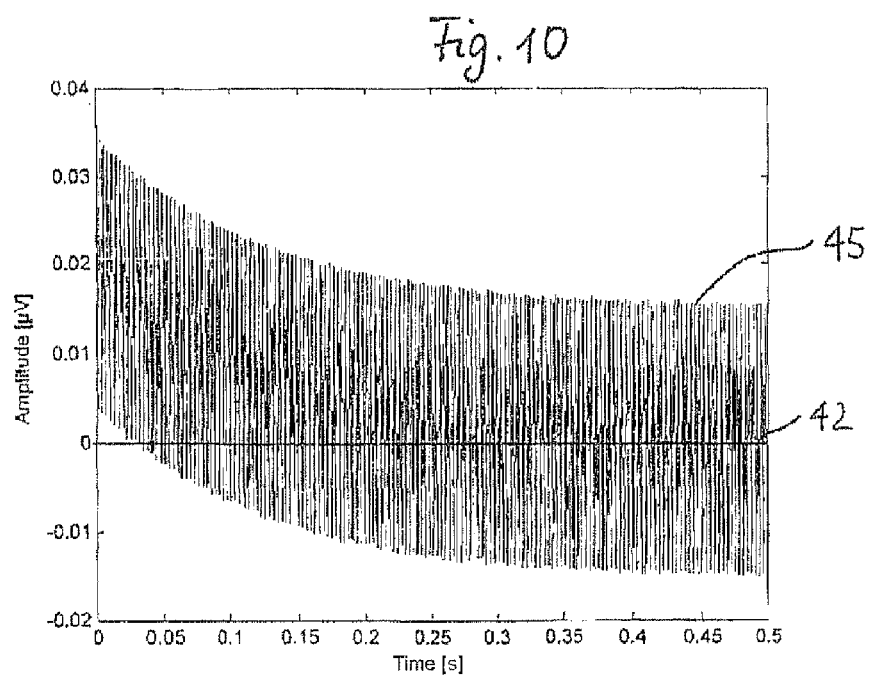
Figure 11:
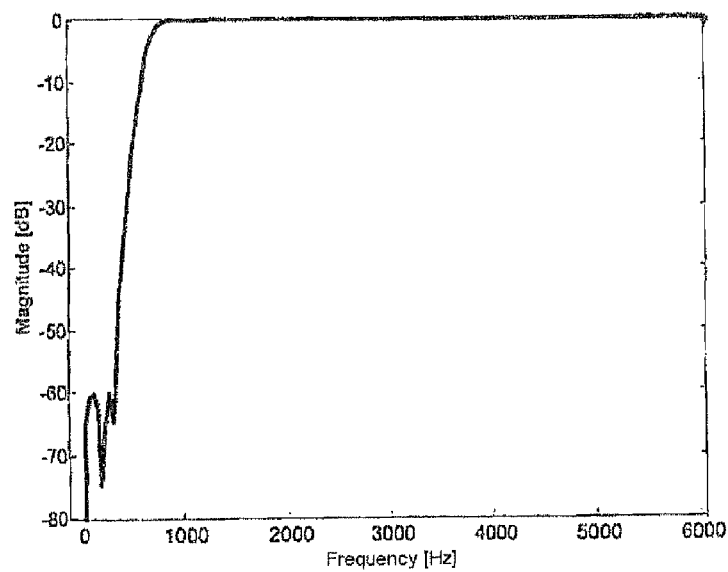
Figure 12:
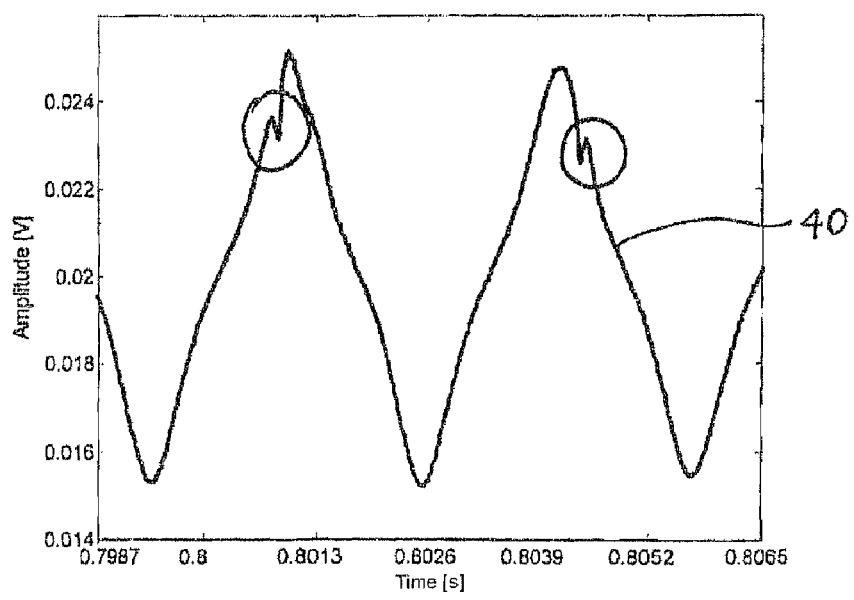
Figure 13:
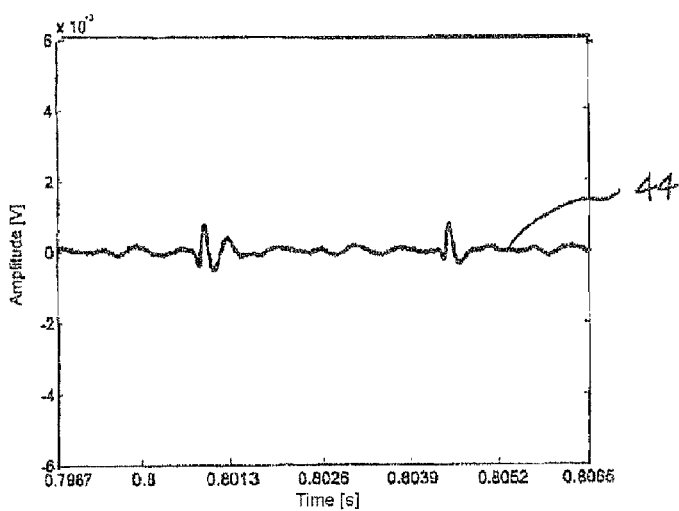
Figure 14:
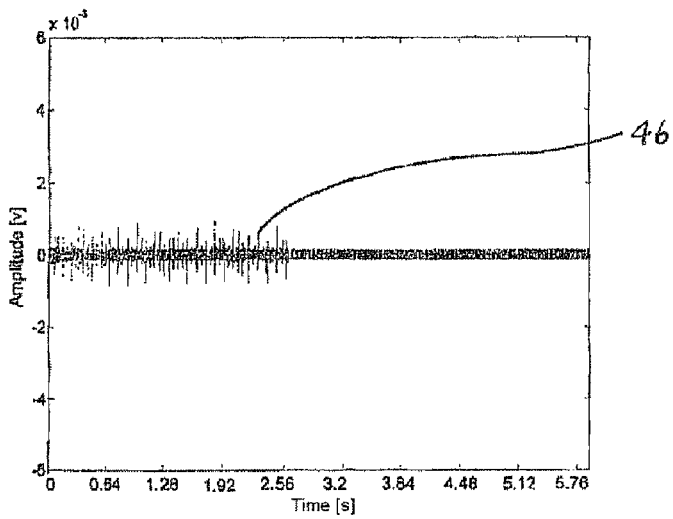
Figure 15:
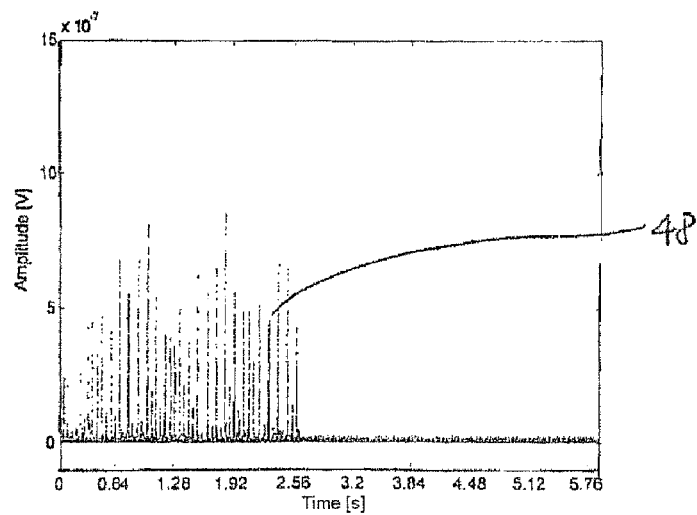

Further advantages, features and special characteristics of the invention can be obtained from the subsequent description of preferred, but not restricting embodiments of the invention, referring to the diagrammatic drawings which are not true to scale and in which:

FIG. 1 shows a diagrammatic representation of a roller bearing according to the invention, FIG. 2 diagrammatically shows the arrangement of strain gauges in a Wheatstone bridge circuit in the outer slot of a roller bearing according to the invention, FIG. 3 shows a typical example of a sensor signal generated in the roller bearing according to the invention, FIG. 4 shows a sensor signal in which a structural sound event occurs, FIG. 5 shows a block diagram of an ASIC according to the invention, FIG. 6 shows a sensor signal in which reference points for evaluating the operating parameters are specified, FIG. 7 shows a representation, similar to FIG. 2, for an arrangement for detecting the axial force acting on the bearing, FIG. 8 shows a representation for explaining the principle of measurement for detecting the rotational direction, FIG. 9 shows a graphical representation of the variation with time of the estimation of the mean value, FIG. 10 shows a graphical representation of the settling characteristic of the sensor signal freed of the mean value, FIG. 11 shows the frequency response of the IIR high-pass filter in the structural-sound branch, FIG. 12 shows a sensor signal for a bearing under radial load and two structural sound events which have occurred, FIG. 13 shows a graphical representation of the structural sound signal at the output of the IIR high-pass filter, FIG. 14 shows a graphical representation of the output signal of the IIR high-pass filter, with structural sound on the left in the signal and no structural sound on the right, FIG. 15 shows a graphical representation of the same section of the signal as in FIG. 14, wherein, however, the ordinary second-order statistical moment of the signal has been calculated recursively, FIGS. 16a to 16h show flow diagrams which represent a preferred embodiment of the method according to the invention for determining all operating parameters in all details.

Firstly, a roller bearing according to the invention and the theoretical principles for a method for determining the operating parameters are described by means of a preferred embodiment and then this method according to the invention for determining these operating parameters will be described in detail by using flow diagrams.

FIGS. 1 and 2 represent the main components of the roller bearing 20 according to the invention, a so-called intelligent bearing. The representation is symbolic and is used for illustration but must not be considered to be restrictive.

The intelligent bearing is intended to provide the user with information about the force acting on the roller bearing 20 (hereinafter also abbreviated with "bearing"), about the rotational speed and the rotational direction of the bearing. Furthermore, a possibility for detecting roller bearing faults and impacts transferred to the roller bearing 20 which become noticeable as structural sound signal is to be created. Such a roller bearing 20 comprises an inner ring 21 and an outer ring 22, at the outside of which a circumferential longitudinal slot 23 is provided. Between the inner ring 21 and in the outer ring 22, roll bodies 24 are arranged so that the inner ring 21 is rotatable with respect to the outer ring 22. To pick up the data, sensor arrangements 26, also called "sensors" 26 in brief, are used which, in the preferred exemplary embodiment, are in each case four strain gauges 31 to 34, which are combined to form a Wheatstone bridge circuit and which are accommodated in a longitudinal slot 23 located on the outside in the outer ring 22 and the resistance of which changes when the roll bodies 24 roll over them. Furthermore, a circuit board 28, arranged in the slot 23, is diagrammatically shown which establishes the conductor connections between the individual strain gauges 31 to 34 of each sensor 26 and the conductor connections between the sensors 26 and the evaluating devices 50, described later. The direction of movement of the roll bodies 24 is marked by an arrow A in FIG. 2.

The slot 23, and thus the circuit board 28, is located in the entire circumference of the outer ring 22 with sensors 26 (strain gauges 31 to 34) arranged at equidistant intervals and a corresponding evaluating device 50 for each sensor, as will be explained in greater detail later. The resultant sensor signal 40 is intended to be evaluated in a suitable manner by the evaluating device 50, preferably electrical circuits in the form of application-specific integrated circuits, so-called ASICs. Therefore, the method according to the invention that is running in the ASICs to determine the sought-after parameters must be dimensioned in such a manner that, in spite of the restricted constructional space and thus the restricted chip size, consistent on-line evaluation of the data is possible. The complete unit of sensor and intelligent evaluating hardware thus represents a so-called "smart sensor" which makes it possible to provide the potential customer with extensive information about the bearing 20 and its operating parameters in real time.

For the design of the method according to the invention, the geometric arrangement of the sensors 26 in the outer ring 22 must be taken into consideration, since this determines the variation of the signal 40 supplied by the sensor 26, and thus the procedure for the signal-related treatment of the sensor signal 40 is also predetermined. The four strain gauges 31 to 34 of a sensor 26, which are interconnected to form a Wheatstone bridge, are in this case arranged in the longitudinal direction of the slot 23 in such a manner that their distance from one another corresponds to half the roll body distance (compare FIG. 2). This ensures that roll bodies 24 always roll simultaneously over two strain gauges 31 and 33 or 32 and 34, respectively, of a bridge. The first strain gauge 31 of the subsequent Wheatstone bridge in slot 23 is again located at half the roll body distance from the last strain gauge 34 of the preceding bridge. This arrangement results in z/2 sensors 26 for z roll bodies in the bearing. This ensures that force influences from all radial directions can be measured. As an alternative, there can also be fewer or even more than z/2 sensors, for example z/2 −1, z/2+1, z+1, or two z sensors. In general terms, the strain gauges (hereinafter also abbreviated by SG) are preferably interconnected to form bridges in such a manner that the distance of the first SG from the third SG and the distance of the second SG from the fourth SG is an integral multiple of the roll body distance. It is also possible to interconnect only two SG (for example the first and the second SG), instead of with a third and fourth SG, respectively, with a non-strain-sensitive resistor to form a Wheatstone half bridge each. Instead of the SG mentioned, other sensors such as, for example, piezoelectric or magnetic sensors can also be used. In this case, the ratio of sensors to roll bodies can be different.

FIG. 2 schematically shows the geometric distribution of strain gauges and roll bodies 24 in the slot 23 of the outer ring 22 for a sensor. When SG1 31 and SG3 33 are rolled over, the bridge output voltage $U_A(t)$ increases with increasing deformation of the strain gauges, caused by the roller bearing pressure, with constant supply voltage $U_B$. The strain gauges, cross-connected in the bridge circuit, are synchronously rolled over or deformed, as a result of which the increase in output voltage increases even further. In the further course, the strain gauges SG1 31 and SG3 33 are increasingly relieved until they have reached their original resistance value again and the bridge is almost balanced. When the strain gauges SG2 32 and SG4 34 are subsequently rolled over, the same variation of the Output voltage occurs but with a reversed sign due to the dimensioning of the bridge circuit, so that, in the end, the approximately sinusoidal variation of FIG. 3 is produced. An alternative embodiment of a sensor 29 with four strain gauges 36, 37, 38 and 39 is specified in dashed lines, which each have an approximately triangular form and, as a result, enable an axial force acting on the bearing 20 to be detected. Naturally, there are further possibilities for designing the strain gauges for a measurement of the axial force.

The greater the force acting on the bearing 20 and on the corresponding sensor 26, respectively, the greater the surface pressure exerted by the roll body 24 on the strain gauges. This leads to a change in the resistance values of the bridge circuit and thus to a correspondingly high deflection of the bridge output voltage. Accordingly, there is a deterministic relationship between the force exerted on the bearing and the output voltage $U_A(t)$ of the bridge circuit, which can be used for evaluating the strain or the force caused by the strain. According to FIG. 3, a signal deviation of approx. 0.03 V is obtained in the mean.

Furthermore, the frequency f of the signal 40 corresponds to the roll-over frequency of the roll bodies 24 at the fixed outer ring 22 which has the following mathematical relation to the rotational speed of the shaft:

$$f = \frac{z}{2} \cdot \left(1 - \frac{D_w \cdot \cos\alpha}{D_{pw}}\right) \cdot n_l \quad (1)$$

Variable z specifies the number of roll bodies 24, $D_w$ is the diameter of the roll bodies, $D_{pw}$ is the pitch circle diameter and a is the pressure angle, which must be set to zero in a cylindrical roller bearing. $n_l$ designates the rotational speed of the shaft in Rev/Min which must be recalculated to the unit Rev/Hz in order to obtain the frequency in Hz.

As can also be seen from FIG. 3, the sensor signal 40 has an offset which differs from sensor to sensor and which is produced as a result of the process of applying the thin film structures of a bridge with no precisely identical resistance values to the roller bearing steel, The asymmetrical distribution of the resistance values results in the constant (DC) component at the bridge output. A further offset can be produced by changes in the environmental conditions, for example due to temperature changes, in the operation of the roller bearing.

In principle, a surface defect in the roller bearing or a structural sound event caused by rolling over dirt particles manifests itself in the application by a signal component in the sensor signal which is at a higher frequency than the approximately sinusoidal fundamental. FIG. 4 shows an example of such a roll body defect.

FIG. 5 shows a block diagram of an evaluating device 50 according to the invention for determining the operating parameters of a roller bearing 20, this evaluating device preferably being constructed in the form of an ASIC which can be arranged in the slot 23 of the outer ring 22 of the bearing 20. Accordingly, the further processing of the sensor signal is performed in two modules arranged in parallel, after digitization of the sensor signal 40 in an A/D converter 56 with subsequent filtering of high-frequency noise components by a low-pass filter 57, preferably an FIR (Finite Impulse Response) filter. This FIR filter 57 is preferably of the 16th order with a cut-off frequency of 12 kHz. It could also have a higher order, for example, but would then need more space in the ASIC 50. At the beginning of each individual module, the frequency range is evaluated which contains the relevant information for the evaluation in the branch. In the upper module, low-pass filtering takes place, preferably in a further FIR filter 58, also of order 16, with a cut-off frequency of $f_g$=3 kHz; since the signal frequencies to be expected for the planned applications can extend to the cut-off frequency of the filter 58, at a maximum. In the dimensioning of the filter limit, greater value was placed on the suppression of higher-frequency signal components than on the transmission of correct amplitudes by the filter module. Any errors which may arise due to the attenuation of amplitudes will be compensated for again later by increasing the calculated signal deviations. This is followed by the determination of the required operating parameters of the bearing in the form of rotational speed, radial force (corresponding to the deviation of the signal 40), axial force and rotational direction which is shown diagrammatically by corresponding function blocks 51 to 54. In the lower module, the frequency correlated with the rotational speed is suppressed, if possible, by a high-pass filter 59, preferably a sixth-order IIR (Infinite Impulse Response) high-pass filter and in function block 55 the generally higher-frequency component of the structural sound signal is weighted and then evaluated in a suitable manner by post-processing. As can be seen from the flow diagrams of FIGS. 16a to 16h, the individual operating parameters are not necessarily determined in accordance with the diagrammatic representation in FIG. 2 separately in individual function blocks (also called partial methods or "evaluating units") 51 to 55 but preferably in a single process in which the individual partial methods or evaluating units (function blocks 51 to 55) are interconnected with one another and lead to real-time results.

The filter limits of the FIR filters are preferably selected in such a mariner that any bearing designs can be evaluated with the same ASIC. Accordingly, the filter limits represent a compromise between achievable signal/noise ratio SNR in the upper branch of the signal evaluation and the distribution of costs for the intelligent bearing to many bearing types and designs. In this embodiment, it was necessary to implement a programmable sixth-order IIR filter in the lower branch of the ASIC. As a result, however, it is also possible for a bearing type to readjust the filter in coarse steps of frequency with varying rotational speed and thus to perform an evaluation of structural sound events which is as optimal as possible. The features of the sensor signal determined in the blocks "rotational direction", "deviation", "rotational speed", "axial force" and "structural sound" are forwarded via an SPI (Serial Peripheral Interface) bus, located in the slot 23 of the outer ring 22 but not shown here, to a DSP (Digital Signal Processor) located outside the bearing, also not shown. The DSP is responsible for organizing the data exchange in the bearing, programming the ASICs located in the bearing and reading the data from the bearing. In addition, the DSP can calculate, for the force acting on the individual sensors 26, an aggregate force which is the result from the respective signal deviations and the geometric distribution of the measuring points. Essentially, however, it forms the interface between the intelligent bearing and the customer application which retrieves data from the bearing by means of the standardized interface supplied by the DSP and acts on the system in accordance with the specifications, and monitors the installation.

It is then necessary to find a method for evaluating the sensor signal 40, and thus for determining the rotational speed, rotational direction, axial force and deviation parameters which is as efficient as possible. One possibility for evaluation with simple computing means is obtained if the sensor signal is crossed with an imaginary artificial line as is shown in FIG. 6.

In FIG. 6, all parameters of the curve of the sensor signal 40 which are necessary for an evaluation and are related to the artificial line are entered. For example, this results in the period of the sensor signal and thus, according to equation (1), the shaft speed, from the two times $t_{up1}$, and $t_{up2}$ which mark the points of intersection between an artificial line 42 and the successive rising edges of the curve variation. Thus, the rotational speed can be determined within the shortest possible time online. Naturally, the points of intersection of the falling edge of the sensor signal 40 with the artificial line 42, $t_{down1}$, and $t_{down2}$ can also be used for calculating the rotational speed. Due to the given sensor geometry, the rotational speed can also be determined in a half cycle which appears to be appropriate, particularly in the case of low rotational speeds. The access time to the value of the shaft speed is halved again by combining the evaluation of the rising and falling edge intersection points, since a new value is available for each half period so that the information is rapidly available even at slow rotational speeds. Once the points of intersection between artificial line 42 and sensor signal 40 have been detected, it can be established in a very simple manner whether the evaluation is currently occurring on the rising or the falling course of the curve. If the evaluation is currently performed for the rising curve, the method according to the invention looks for the maximum value in the samples of the sensor signal 40 present against time until the point of intersection between falling edge and artificial line 42 is reached. Following this, the smallest value is sought in the samples present until the next point of intersection for the rising edge is detected. In this manner, the maximum $y_{max}$ and the minimum $y_{min}$ is obtained for each signal period which, subtracted from one another, represents the signal deviation and thus the counterpart for the radial force picked up for this sensor 26. Here, too, the access time to the deviation value and thus to the radial force can be halved by continuously alternating to compute the differences $y_{max1}-y_{min1}$ and $y_{max2}-y_{min2}$ etc.

A slight modification of the SG arrangement within the measuring bridge, shown in FIG. 7, also makes it possible to install a criterion for the rotational direction in the signal variation by means of the concept of the artificial line. For this purpose, an SG pair (SG2 32' and SG4 34' in the fig.) is arranged in the sensor 27, offset in the running direction A compared with the strain gauges 32 and 34, shown dashed for the illustration, according to the arrangement known from FIG. 2, in such a manner that they are rolled over at an earlier time. This makes it possible to generate an asymmetry in the course of the sensor signal 40 which can be used for detecting the direction of rotation. FIG. 8 shows the principle of measurement on a positive half cycle of the sensor signal. In comparison with the real asymmetry, the relationships in the representation are drawn excessively in order to illustrate the principle. Due to the displacement of the strain gauges 32' and 34', the extremes of the signal 40 are displaced relative to one another in the time domain so that, for example, the maximum is either on the left or on the right of the temporal center, in each case depending on the direction of rotation, (designated by "0" on the abscissa in FIG. 8) of $t_{up1}$ and $t_{down1}$, wherein $t_{up1}$ and $t_{down1}$ do not change in the arrangement according to FIG. 8 compared with the arrangement according to FIG. 2.

The direction of rotation is thus obtained, for example, from the sign of the expression $$\frac{t_{up1}+t_{down1}}{2}-t_{max1} \quad (2)$$

As can be easily seen, the evaluation of the sensor signal 40 can be carried out in a very simple manner in this way. However, here, too, the problem is to construct the artificial line 42 in a suitable manner. In principle, the mean value of the signal 40 with offset could be used as artificial line 42. However, this would also require the corresponding storage space for temporarily storing the values for at least one period after the conventional calculation of the mean value. Assuming, for example, a slow rotational speed of 100 Rev/Min, a signal frequency of approx. 11 Hz is obtained. With the sampling frequency of the system of 78 kHz used, accordingly, approx. 7000 values with 14 bits word width in each case would have to be temporarily stored for one period which, in accordance with an integration density based on a pattern size of 0.35 μm—corresponds to a chip area of approx. 90 mm². On the basis of the geometric requirements, such a method would thus not be practicable if the mean value is formed in a conventional manner; furthermore, no online evaluation would be possible.

However, a solution can be found by estimating the required mean value of the signal 40 recursively/adaptively as the aforementioned artificial line 42 intersecting the signal 40. This recursive/adaptive estimation of the mean value represents a preferred embodiment of the present invention; in general, it is sufficient if an artificial line is selected which intersects the signal 40 and is essentially parallel to its envelope or essentially follows this signal, respectively.

The following scalar equation (3) is obtained for the above objective for estimating the mean value of the curve variation supplied by the strain-sensitive sensors 26:

$$E\{Y\}(k+1)=E\{Y\}(k)+K(k)\cdot(y(k+1)-E\{Y\}k)) \quad (3)$$

The stochastic variable $E\{Y\}(k)$ stands for the linear expected value of the sensor signal $y(k)$ at time k and $K(k)$ represents the feedback gain or, in other words, the adaptation constant. As a result, a significant hurdle for the evaluation of the operating parameters of the bearing 20 has been taken and the simple method, briefly outlined above, for determining rotational speed, rotational direction, radial force and axial force can be carried out. The mean value thus calculated has a signal-adaptive character and follows the offset which may change slowly with time, in certain circumstances, due to temperature influences. Thus, the appropriate evaluation of the sensor signal 40 is always guaranteed even if the signal 40 has a non-steady-state characteristic with regard to its mean value.

For practical use, it may in fact be of advantage to calculate the feedback gain $K(k)$ dynamically as a function of noise processes. For example, the adaptive estimation can be designed in accordance with stochastic criteria with regard to speed and consistency of the estimation. The result is a feedback gain $K(k)$ which changes in the course of time. At the beginning of the adaptation, the values of $K(k)$ are very high which leads to a rapid settling on the required value. In the further course of time, the gain decreases exponentially. This distinctly reduces the influence of the disturbances on the estimation. However, the resulting additional functionality at preferably maximum efficiency is disproportionate to the necessary complexity of the calculation of the exponential variation. Therefore, the noise influences are not taken into further consideration in the method according to the invention. Instead, a static gain K (also called c0 later) is of greater practical use because, as a result, the overall computational effort for estimating the mean value remains very low. In total, one register each is needed for the static factor K or c and for the mean value E{Y}(k) according to equation (3). The computing effort for determining the estimated values for the mean value is based on a few fundamental computing operations.

FIG. 9 shows a variation of the estimation of the mean value 43 for the sensor signal 40, specified in FIG. 3, according to the method discussed.

For calculating the operating parameters, the mean value obtained for each sampling clock cycle is subtracted from the current sensor signal value.

For the representation, the feedback gain K=0.0001 was selected. FIG. 10 shows the settling characteristic of the sensor signal 45 without mean value 43. The mean value is reached after about 0.5 seconds so that the parameters can be read from this time on, at the latest. However, the sensor signal 45 already crosses the zero line, which represents the artificial line 42, from t=0.05 s. The method according to the invention already provides result values from this time on even though the values themselves still have slight errors because the points of intersection change relative to one another when the rotational speed remains the same.

In the next step, the theoretical principles for a suitable method for the evaluation of the structural sound events, that is to say the detection of structural sound events, are described.

The frequency response of the sixth-order IIR filter 59 located in the structural sound branch of FIG. 5 can be programmed in its frequency characteristic by downloading coefficients via the SPI bus. For the detection of roller bearing faults, a high-pass characteristic is imposed on the IIR filter in order to separate the high-frequency structural sound signals from the approximately sinusoidal fundamental signal according to FIG. 3.

FIG. 11 shows a typical application-related frequency response of the filter 59. The cut-off frequency for the pass band is 1 kHz. In the cut-off region, the attenuation is 60 dB and, in the pass band, the attenuation is negligibly small at 0.0002 dB. In a first step, the high-pass filter 59 can be used for extracting the structural sound event as shown in the circled section of FIG. 4 or as can be seen circled twice in FIG. 12.

The result of the filtering is shown in FIG. 13. In principle, the filter supplies a very good result due to its good characteristics in the pass band and in the cut-off region, by precisely separating the structural sound event from the low frequencies in real time, so that the fundamental of the sensor signal 40 can no longer be seen in the filtered signal 44. On the basis of this, an automated verification of a structural sound event could be arranged by drawing a threshold in parallel with the time axis. As soon as the threshold is exceeded by the output signal 44 of the IIR filter 59, a structural sound event exists. However, the selectivity at the output of the filter 59 between structural sound event and the time sections in which no structural sound occurs is not very high. If the threshold is low enough, it is possible, in principle, that it is continuously exceeded due to the noise quantities with superimposed filter signal 44. On the other hand, to avoid these false alarms, the threshold must not be too high since otherwise it is not only the noise quantities which do not reach the threshold but structural sound events which are less distinct can no longer be detected. For this reason, it is very difficult to find the optimum threshold function, particularly if no automated mechanism can be used due to the lack of computing capacity.

A possibility for improvement consists in increasing the ratio between the structural sound signal and fundamental noise of the filter output and thus of the signal/noise ratio in this branch. For this purpose, the calculation of the ordinary second-order statistical moment at the output of the filter 59 can be preferably used:

$$E\{Y^2\}(k) = \frac{1}{n} \cdot \sum_{k=1}^{n} y^2(k) \qquad (4)$$

Due to the quadratic weighting of the output values of the IIR filter 59, structural sound events are emphasized much more with respect to the noise processes and a threshold for reliable detection can be placed decidedly simpler, as has been shown by tests on real data. However, here, too, the restriction is to preferably not use methods having a high requirement for storage space, so that the determination of the ordinary second statistical moment in the conventional form of equation (4) over N values cannot be carried out. However, similar to the method for determining the rotational speed described above, here, too, an alternative method can be found for the calculation. Analogously to equation (4) for estimating the linear expected value, the recursive signal-adaptive approach for the ordinary second statistical moment is obtained:

$$E\{Y^2\}(k+1)=E\{Y^2\}(k)+K(k)\cdot(y^2(k+1)-E\{Y^2\}(k)) \qquad (5)$$

The accuracy of the detection of structural sound can be improved even further by combining the results of the recursive equations correspondingly and evaluating the resultant signal. For example, the recursive signal-adaptive version of the variance calculation is obtained thus:

$$\sigma_y^2(k+1)=E\{Y^2\}(k+1)-[E\{Y\}(k=1)]^2 \qquad (6)$$

In the text which follows, the relevance of the calculated estimated values for the operating parameters which can be determined by means of the method according to the invention will be briefly discussed. In the determination of the "rotational speed", "rotational direction", "radial force" and "axial force" operating parameters, the result of the mean-value estimation no longer appears directly but this does not narrow down the significance for the quality. Instead, it forms the foundation for the "slender", i.e. efficient evaluation of the data and for determining the operating parameters sought.

During the determination of the rotational direction, a mean value of approx. −0.13 ms was obtained for the deviation of the maximum from the center axis of the positive half cycle of the sensor signal, for example, which corresponds to about ten samples at the sampling frequency of $f_s$=78 kHz used. During the entire recording, the sign was always less than zero which makes it possible to unambiguously allocate a rotational direction, Correspondingly, the other rotational direction would produce a positive sign in the deviation.

In contrast to the recursive calculation of the linear expected value in the case of the aforementioned operating parameters, the determination of the second statistical moment is included directly in the result value during the determination of structural sound events. In order to represent the operation of the method according to the invention, the output signal 46 of the IIR filter 59, shown in FIG. 14, is used, where only the front area of the output signal 46 contains a structural sound signal. The rear area is accommodated by a roller bearing without structural sound signal in order to be able to make a direct comparison.

If the recursive adaptive estimation of the ordinary second-order statistical moment according to equation (5) is applied to this signal 46, the first section is distinctly emphasized in the resultant signal 48 as shown in FIG. 15. This makes it possible to detect the occurrence of a structural sound event much better via a threshold value than was the case previously in the signal 46 according to FIG. 14.

The analyzability of the obtained signal 48 can be increased further if the aforementioned recursive adaptive estimation of the ordinary second-order moment according to equation (5) is applied to the signal 48 and then its variance is calculated according to equation (6) by analogously using the equation (3).

If, in contrast, the variance is already calculated with signal 46, this also brings an improvement in the analyzability of the signal 46, but not to the extent as is the case in the calculation of the variance of the signal 48. However, this saves a few calculations, resulting in fast processing.

In addition to the more distinct signal/noise ratio in the structural sound branch of FIG. 5, the time information when the result exceeds the threshold can be evaluated and the fault source can be allocated on the basis of the period produced as a result. In this example, the feedback gain was set to $K_r = 0.8$.

The accuracy of the method according to the invention is relevant in two ways: the resolution in the amplitude domain and the resolution in the time domain. The precision of the values for signal deviation and for structural sound determined by the intelligent bearing depends on the quantization and the dynamic range of the analog/digital conversion. The rotational speed accuracy is predetermined by the temporal resolution determined by the sampling pattern of the system, as is the rotational direction, the latter measure representing a qualitative—not quantitative—feature of the bearing.

Depending on the voltage supply of the ASIC implemented for the tests, which, according to specification, must be 3.0 V minimum and 3.6 V maximum, and the dynamic signal amplitude for the analog/digital converter from −3 mV to +3 mV per volt supply voltage, a voltage range of between −9.9 mV and +9.9 mV is obtained for the sensor signal to be converted, assuming a mean supply voltage of 3.3 V. This corresponds to a maximum signal deviation of 19.8 mV. In the defect-free case, the word length of the analog/digital converter implemented is 14 bits so that a voltage value of 1.2 μV is mapped on one digit. The maximum load of the cylindrical roller bearing considered here is assumed to be 50 kN. Distributed over the complete range of values with a maximum dynamic range of the analog/digital converter, a theoretical accuracy of approx. 3 N per digit is thus produced. This more than meets the requirements for the method according to the invention since a much coarser quantization occurs due to the transmission system of environmental design, bearing and sensor. Measurements resulted in a resolution in the range of 200 N. The quantization in the temporal direction is predetermined by the sampling frequency of the system which is exactly 78.125 kHz in the system used for the tests. From this, the maximum error of rotational speed—and of rotational direction—occurring theoretically is derived from the reciprocal of the sampling frequency: $T_a = 1/f_a = 12.8$ μs. With a maximum possible roll-over frequency of all bearings in question of 3 kHz, this results in a maximum error of 3.8%. This represents a very good compromise between the relative error in the measurement and the system data rate occurring.

In the following, a method by means of which all aforementioned operating parameters can be determined in mutually interconnected method parts is described as preferred embodiment by means of the flow diagrams shown in FIGS. 16*a* to 16*h*. For the sake of better clarity, however, the description is subdivided into the determination of in each case a single operating parameter, the parameter "T" for elapsed time being omitted for the sake of simplification; the elapsed time is thus implicitly contained in the parameter "k". The connection of the flow diagrams with one another is specified by the links V1 to V8.

As already stated, when the roller bearing 20 is rotating, each sensor 26 delivers a wave-shaped signal 40 which is dependent on its rotational position, for example as shown in FIG. 3. The signal 40 is sampled at—preferably equidistant—sampling points k, k+1, k+2 and the resultant samples x*(k), x*(k+1), x*(k+2), . . . are processed further in accordance with the respective parts of the method according to the invention.

For k=0, the signal 40 is first sampled for determining its instantaneous value as starting sample x*(0) and a starting value is established for the estimated value E(x*(k=0)) as expected value of the signal 40. Following this, the run variable k is incremented by 1. Following this, the signal 40 is sampled at time k+1 for determining its instantaneous value as (k+1)th sample x*(k+1).

Rotational Speed

Figure 16A:
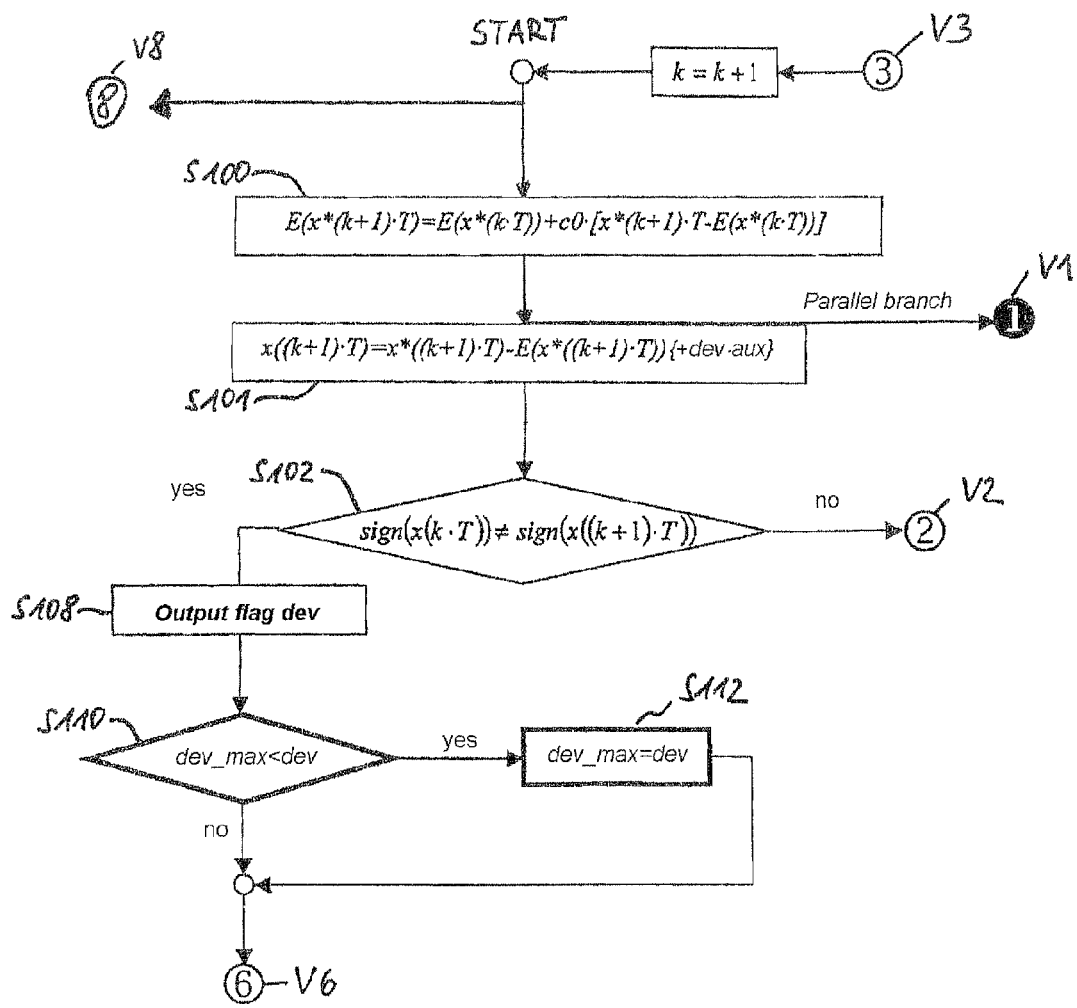

In step S100, according to FIG. 16*a*, a (k+1)th estimated value E(x*(k+1)) is calculated as sum of the preceding kth estimated value E(x*(k)) and the product of an adaptation constant c0 with the result of a subtraction of this kth estimated value E(x*(k)) from the (k+1)th sample x*(k+1). In step S101, the (k+1)th estimated value E(x*(k+1)) calculated in step S100 is then subtracted from the k+1th sample x*(k+1) and the difference is used as a (k+1)th computing value x(k+1) for the further method. For c0, 0<c0<1 applies. The last term in wavy brackets in the calculation of step S101 is not relevant for the calculation of the rotational speed and can therefore remain unconsidered. In step S102, the sign of this calculated (k+1)th computing value x(k+1) is compared with the sign of the corresponding kth computing value x(k) from the previous run-through of this method part. After that, the method branches into two branches:

If the signs compared in step S102 are equal, i.e. signal 40 has not undergone a sign change and thus, in other words, a zero transition, k is incremented by 1 and method steps S100 to S102 are repeated. In other words, none of method steps S302 to S316 according to FIG. 16*c* are required for determining the rotational speed. If the signs compared in step S102 are unequal, i.e. signal 40 has performed a zero transition, a comparison is made in a further case distinction in step S203 according to FIG. 16*b* whether the (k+1)th computing value x(k+1) of the current step S101 is greater than the corresponding kth computing value x(k) which has already been determined during the previous run-through of step S101. In other words, a determination is made whether the signal 40 is on a rising edge or a falling edge. Method steps S108, S110 and S112 according to FIG. 16*a* are also not required for determining the rotational speed. Incidentally, determining the zero transitions provides the additional advantage that, as a result, it is always known in the method in which phase of sampling the signal 40 one is currently located. The zero transitions represent a "navigation system", as it were, and facilitate the correlation of the measurement values captured. In this respect, it must be mentioned that the zero transitions, for example in the case of a change of the form of the sensors 26, 27 or 29, are "strapped" to the x axis, as it were, whilst the shape of the signal changes, as is shown, for example, by the asymmetry in FIG. 8.

If it is found in step S203 with x(k+1)>x(k) that the signal is on a rising edge, a check is made in step S210 whether the current computing value x(k+1) is exactly zero. If this is so, the time at which this computing value has occurred is fixed as time $t_{up2}$ (compare FIG. 6) of the zero transition on the rising edge in step S214. If this is not the case, however, the time $t_{up2}$ of the zero transition on the rising edge is determined by linear interpolation between the two computing values x(k+1) and x(k) in step S212. This linear interpolation represents a preferred procedure of the method according to the invention. As an alternative, the time immediately before the occurrence of the zero transition or the time immediately after its occurrence could also be used as useful approximation—in order to save the calculation for the linear interpolation, wherein the same time before or after the occurrence of the zero transition would then always have to be taken into consideration in the further method. In step S404 according to FIG. 16d, the "rising" period length $\Delta T_{up}$ is then calculated by forming the difference between two zero transitions on the rising edge, namely the "new" time $t_{up2}$ just determined and the "old" time $t_{up1}$ determined in the previous run-through. Following this, the "new" time $t_{up2}$ is then stored as "old" time $t_{up1}$ in step S406 so that it can be used in a new calculation of a "rising" period length $\Delta T_{up}$. Step S408 is not required for determining the rotational speed and in step S410 an output flag for the output of the "rising" period length $\Delta T_{up}$ is set—i.e. an instruction is issued to the processor for calculating it—and this is output as measure of the rotational speed. It is clear that in the very first run-through of the method, i.e. during the first determination of the "new" time $t_{up2}$, there is no "old" time $t_{Up1}$ available as yet. For this reason, a "rising" period length $\Delta T_{up}$ is output for the first time when a "new" time $t_{up2}$ has been calculated for the second time. After that, k is incremented by 1 and the method is continued with step S100.

If the result in step S203 is not x(k+1)>x(k), in contrast, this means that the signal is on a falling edge. In this case, steps S230, S232 or S234 are carried out analogously to the steps S210, S212 and S214, described before, where, instead of $t_{up2}$, the time $t_{down2}$ of the zero transition on the falling edge is determined. Analogously to steps S404 and S406, the "falling" period length $\Delta T_{down}$ is then calculated by forming the difference between the "new" time $t_{down2}$ and the corresponding "old" time $t_{down1}$ in steps S504 and S506 according to FIG. 16e, and is output in step S510 as a measure of the rotational speed. After that, k is likewise incremented by 1 and the method is continued with step S100.

By this means, the rotational speed is determined—namely twice per period: in the form of the "rising" period length $\Delta T_{up}$ and the "falling" period length $\Delta T_{down}$.

In principle, it would also be possible to determine the period length by the distance between two minima or two maxima, but since these minima or maxima form a relatively wide "dome" and therefore cannot be detected as sharply as the zero transitions, their use is more inaccurate, especially in the case of noise, and not preferred, therefore.

In the determination of further operating parameters, steps which have already been described previously are not again represented in detail in order to avoid repetitions, especially since they do not need to be carried out again, in any case.

Axial Force

When the axial force is determined, steps S100 and S102 are the same as in the determination of the rotational speed, and the only difference in step S101 from step S101 used in the determination of the rotational speed consists in that in the calculation of the computing value x(k+1), an auxiliary variable dev-aux is added, i.e. the last term in wavy brackets in the calculation of step S101 is taken into consideration this time. This only means that the artificial line 42 is not intended to be identical with the zero line but is located underneath it. The auxiliary variable dev-aux can be freely selected, but it is preferred that it is composed of a product of a number (aux) between 0 and 0.5 by the signal deviation (dev).

Steps S203 and steps S210, S212 and S214 for the rising edge and steps S230, S232 and S234 for the falling edge are carried out precisely as in the determination of the rotational speed.

For the rising edge, the time interval ($\Delta t\_nhw$), how long the negative half cycle lasts, is then determined in step S402, by subtracting the "new" time $t_{down2}$ of the falling edge from the "new" time $t_{up2}$ of the rising edge. The representation in FIG. 6 differs from this since it does not take into consideration that the corresponding values $t_{up1}$, $t_{up2}$, $t_{down1}$, $t_{down2}$ "wander on" during different method runs, i.e. that their designation changes progressively in the course of the method. After that, step S406 is carried out, which represents such a progressive change.

In parallel with the execution of steps S101 to S406, a further method branch is carried out which is designated as "parallel branch" in FIG. 16a and FIG. 16f and begins with step S601 and FIG. 16f. Step S601 differs from step S101 only in that the auxiliary variable dev-aux is not added but subtracted. This only means that the signal 40 is to intersect with a corresponding artificial line which is higher up. To be more easily distinguishable from the computing value x(k+1) of step S101, the computing value resulting in step S601 is designated by y(k+1), this distinction being retained in steps S602, S603, S610, S612, S614, S630, S632 and S634 which otherwise proceed identically to steps S102, S203, S210, 5212, S214, S230, S232 and S234, respectively, in the "main branch". To make it clear that the zero transitions determined in the "main branch" differ from those determined in the parallel branch, the latter are marked by a "*". In step S638, the time interval ($\Delta t\_phw$), how long the positive half cycle lasts, is then determined for the falling edge, by subtracting the "new" time $t^*_{up2}$ of the rising edge from the "new" time $t^*_{down2}$ of the falling edge. Following this, step S506, which is analogous to step S406, is then carried out.

In step S408 and/or step S508, the time interval $\Delta t\_phw$ determined in step 5638 can then be subtracted from the time interval $\Delta t\_nhw$ determined in step S402, wherein the sign of this difference $\Delta t\_phw$-$\Delta t\_nhw$ specifies the direction ax_dir of the axial force acting on the bearing 20 and can be output in step S410 and/or S510. In addition, the amount ax_for of the difference $\Delta t\_phw$-$\Delta t_{nhw}$ can be determined as a measure of the magnitude of the axial force in step S409 and/or S509 and output in step S410 and/or S510.

Thus, the axial force acting on the bearing 20 is also determined.

Radial Force

In the determination of the radial force, steps S100, S101 and S102 are identical to the determination of the rotational speed. If the signs compared in step S102 are equal, i.e. if no zero transition has taken place, a check is made in step 5302 whether the sign of the (k+1)th computing value x(k+1) of step 5101 is identical to 1, i.e. the signal 40 is in the positive half cycle. If yes, a check is made in step S304 whether this (k+1)th computing value x(k+1) is greater than the previously determined maximum max_value of the signal 40, and if this is so, this (k+1)th computing value x(k+1) is stored as new maximum max_value of the signal 40 in step S305, then k is incremented by 1 and the method is continued with step S100.

If this is not so, the deviation (dev) of the signal 40 is determined in step S308 by forming the difference max_value−min_value between its maximum max_value and its minimum min_value, the determination of the minimum min_value being described later. Naturally, the deviation can only be calculated in the method according to the invention when both the maximum max_value and the minimum min_value are available. Then k is incremented by 1 and the method is continued with step S100. If it is found in step S302 that the sign of the (k+1)th computing value x(k−1) is not identical to 1, i.e. the signal 40 is in the negative half cycle, the minimum min value of signal 40 is determined and stored, and the deviation is calculated, analogously in steps S314, S315 and S318, respectively. Then k is again incremented by 1 and the method is continued with step S100. It must be mentioned that the signal deviation can also be calculated by the reversed difference, that is to say min value−max_value, and thus also twice per signal period, and output.

As soon as it is found in step S102 that a sign change or zero transition, respectively, has taken place, an output flag that the deviation can be output as a measure of the radial force acting on the bearing 20 is set in step S108. In step S110, a check is made whether the deviation is greater than a previously determined maximum signal deviation dev_max. If this is so, the current deviation determined is stored as a new maximum signal deviation dev_max. This is used for detecting strong impacts. The value for the maximum signal deviation dev_max can be deleted at any time by the user.

After that, a case distinction whether the signal is in a rising edge or in a falling edge is again performed in step S203. In the former case, the maximum max_value and in the second case, the minimum min_value of the signal 40 is reset to zero, k is incremented by 1 and the method is continued with step S100.

Thus, the radial force is also determined as a further operating parameter of the roller bearing 20.

It can be seen from the above description that a minimum or a maximum is only accepted as such when a zero transition has been detected between these two extremes. This ensures that in the case of a "dent" in the signal, no subextreme which may be associated with it is detected as "false" minimum or maximum.

Rotational Direction

In the determination of the rotational direction, steps S100, S101 and S102 are the same as in the determination of the rotational speed.

If the signs compared in step S102 are equal, i.e. if no zero transition has taken place, a check is made in step S302 (FIG. 16c) whether the sign of the (k+1)th computing value x(k+1) of step S101 is identical to 1, i.e. the signal 40 is in the positive half cycle. If yes, a check is made in step S304 whether this (k+1)th computing value x(k+1) is greater than the previously determined maximum max_value of the signal 40, and if this is so, the time max_value_t (corresponding to $t_{max1}$ in FIG. 8 and the expression (2)) at which this (k+1)th computing value x(k+1) (i.e. max_value) has occurred is stored in step S306, then k is incremented by 1 and the method is continued with step S100. If it is found in step S302 that the sign of the (k+1)th computing value x(k+1) is not identical to 1, i.e. the signal 40 is in the negative half cycle, a check is made analogously in step S314 whether this (k+1)th computing value x(k+1) is smaller than the previously determined minimum min_value of signal 40, and if this is so, the time min_value_t at which this (k+1)th computing value x(k+1) (i.e. min_value) has occurred is stored in step S315, then k is incremented by 1 and the method is continued with step S100.

Figure 16B:
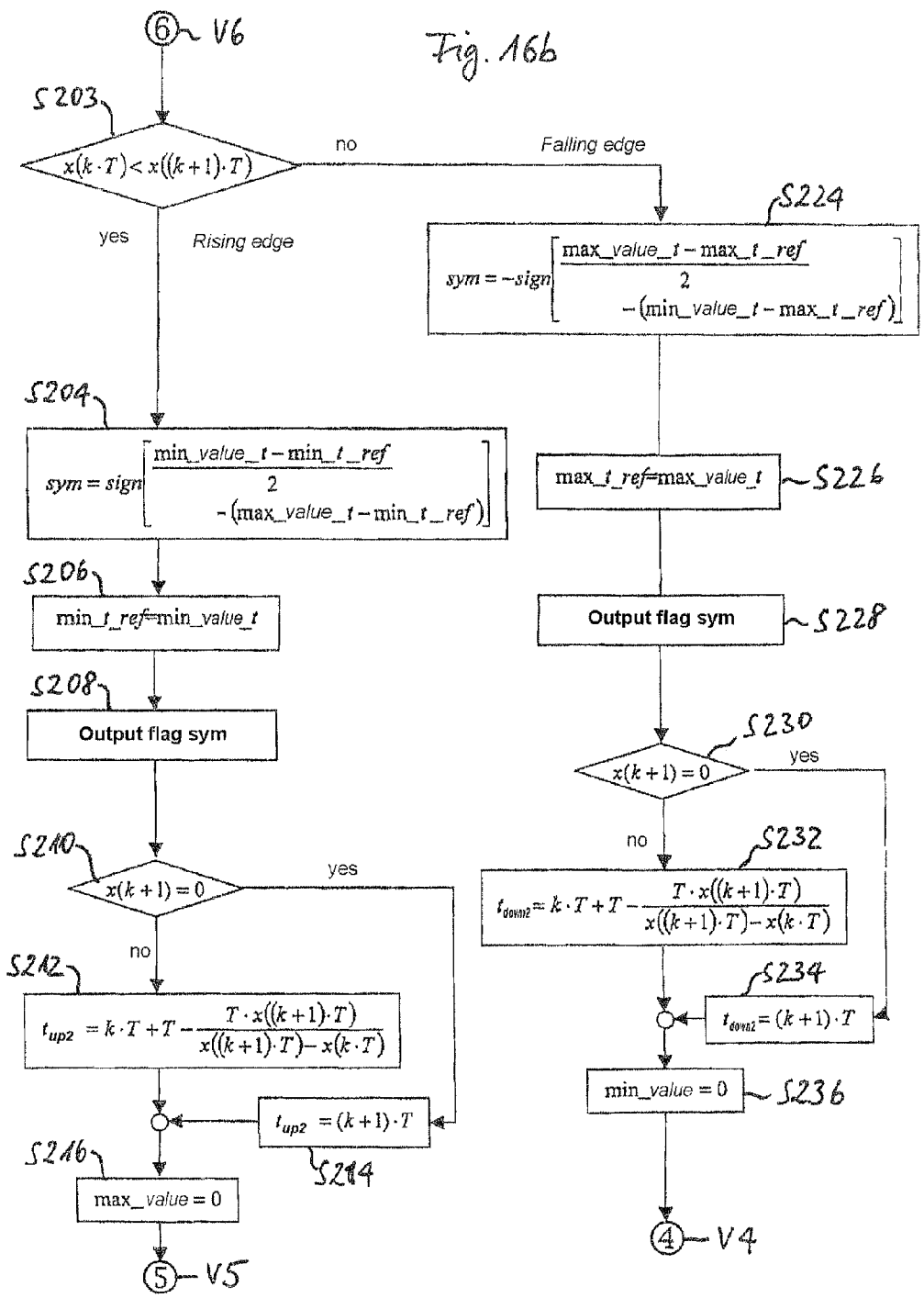
Figure 16E:
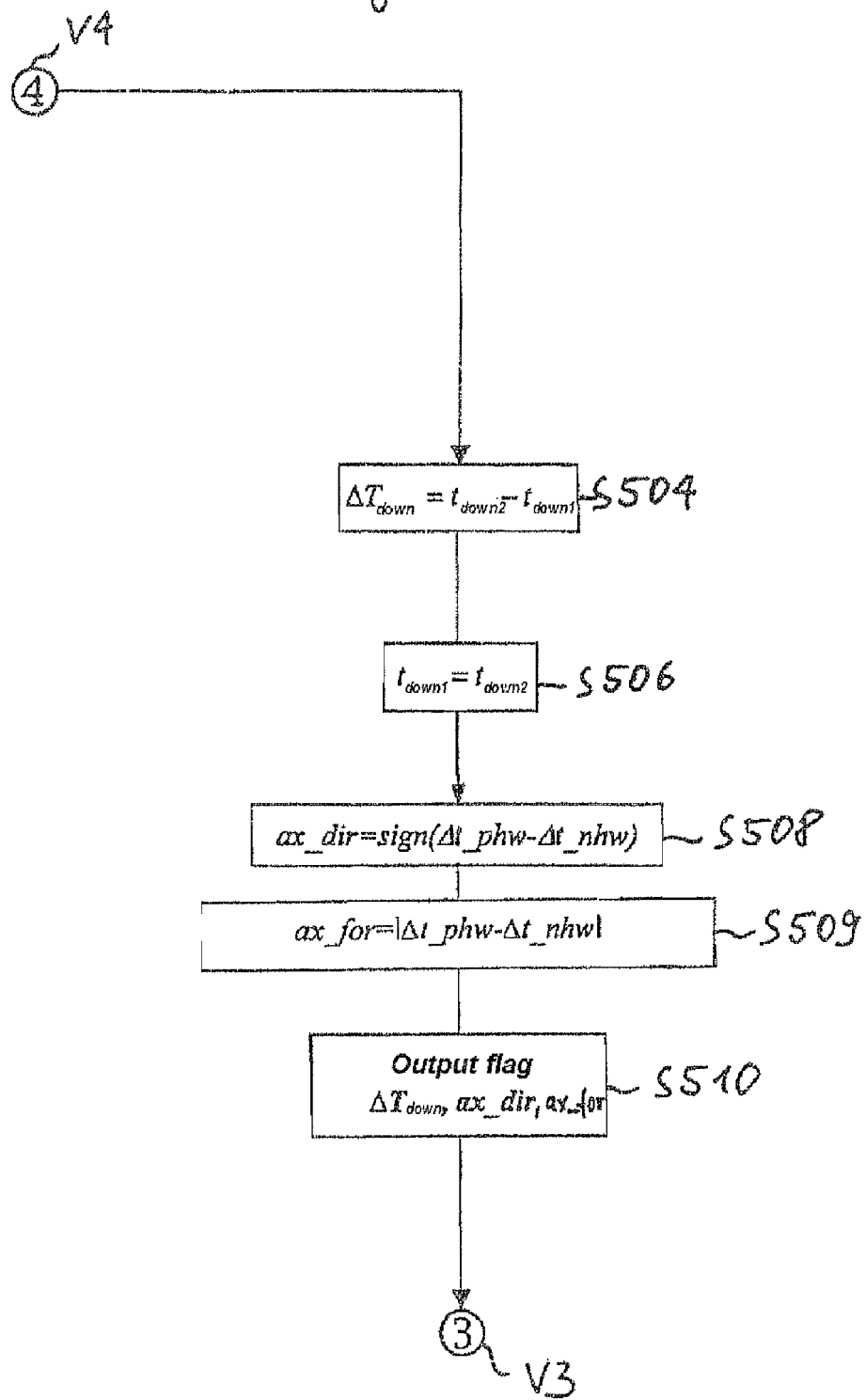

If the signs compared in step S102 are not equal, i.e. signal 40 has performed a zero transition, a comparison is made in a further case distinction in step S203 according to FIG. 16b, whether the (k+1)th computing value x(k+1) of the current step S101 is greater than the corresponding kth computing value x(k) which has already been determined during the previous run-through of step S101. In other words, it is determined again whether the signal 40 is located on a rising edge or on a falling edge. If the signal 40 is on the rising edge, the rotational direction is determined in step S204 in the following manner: a minimum auxiliary variable min_t_ref, the meaning of which will still be explained later, is subtracted from the time min_value_t of the occurrence of the minimum of the signal 40, and the result is divided by 2, and from this, the result of the subtraction of the minimum auxiliary variable min_t_ref from the time max_value_t of the occurrence of the maximum of the signal 40 is subtracted. The sign of this value is used as specification of the rotational direction sym of the roller bearing 20, according to which an output flag is set for the rotational direction sym in step S208 and is output. Before the output, however, the time min_value_t of the occurrence of the minimum of the signal 40 is stored as new minimum auxiliary variable min_t_ref in step S206. This also clarifies the significance of this minimum auxiliary variable min_t_ref. Following this, k is incremented by 1 and the method is continued with step S100. If, however, the signal 40 is on the falling edge, the rotational direction sym is determined in step S224 (similar to step S204), in the following manner: a maximum auxiliary variable max_t_ref, the meaning of which will also be explained later, is subtracted from the time max_value_t of the occurrence of the maximum of the signal 40 and the result is divided by 2 and from this, the result of the subtraction of the maximum auxiliary variable max_t_ref from the time min_value_t of the occurrence of the minimum of the signal 40 is subtracted. The sign of this value is again used as specification of the rotational direction sym of the roller bearing 20, according to which an output flag for the rotational direction sym is set in step S228 and is output. Before the output, however, the time max_value_t of the occurrence of the maximum of the signal 40 is stored as new maximum auxiliary variable max_t_ref in step S216. Thus, the significance of this maximum auxiliary variable max_t_ref is also explained.

Thus, the rotational direction of the roller bearing 20 is also determined.

In the preceding text, it was assumed implicitly by using a uniform adaptation constant c0 in the respective method parts for determining the rotational speed, the rotational direction, the axial force and the radial force that this adaptation constant is identical everywhere in the calculation of the expected value of the signal 40. However, it is clear that, if necessary, different adaptation constants can be used in the different method parts if this brings advantages for the calculation of the various operating parameters.

The description of the determination of structural sound events follows.

Structural Sound

For this purpose, the signal 40 is first sampled for k=0 for determining its instantaneous value as starting sample x*(0). No estimated value E(x*(k=0)) is needed as expected value of the signal 40, but the second ordinary statistical moment $E\{V^2\}$(k=0) of the filter sample v(k=0), as will be explained later. Following this, the run variable k is incremented by 1. Following this, the signal 40 is sampled at time k+1 for determining its instantaneous value as (k+1)th sample x*(k+1), etc.

Figure 16G:
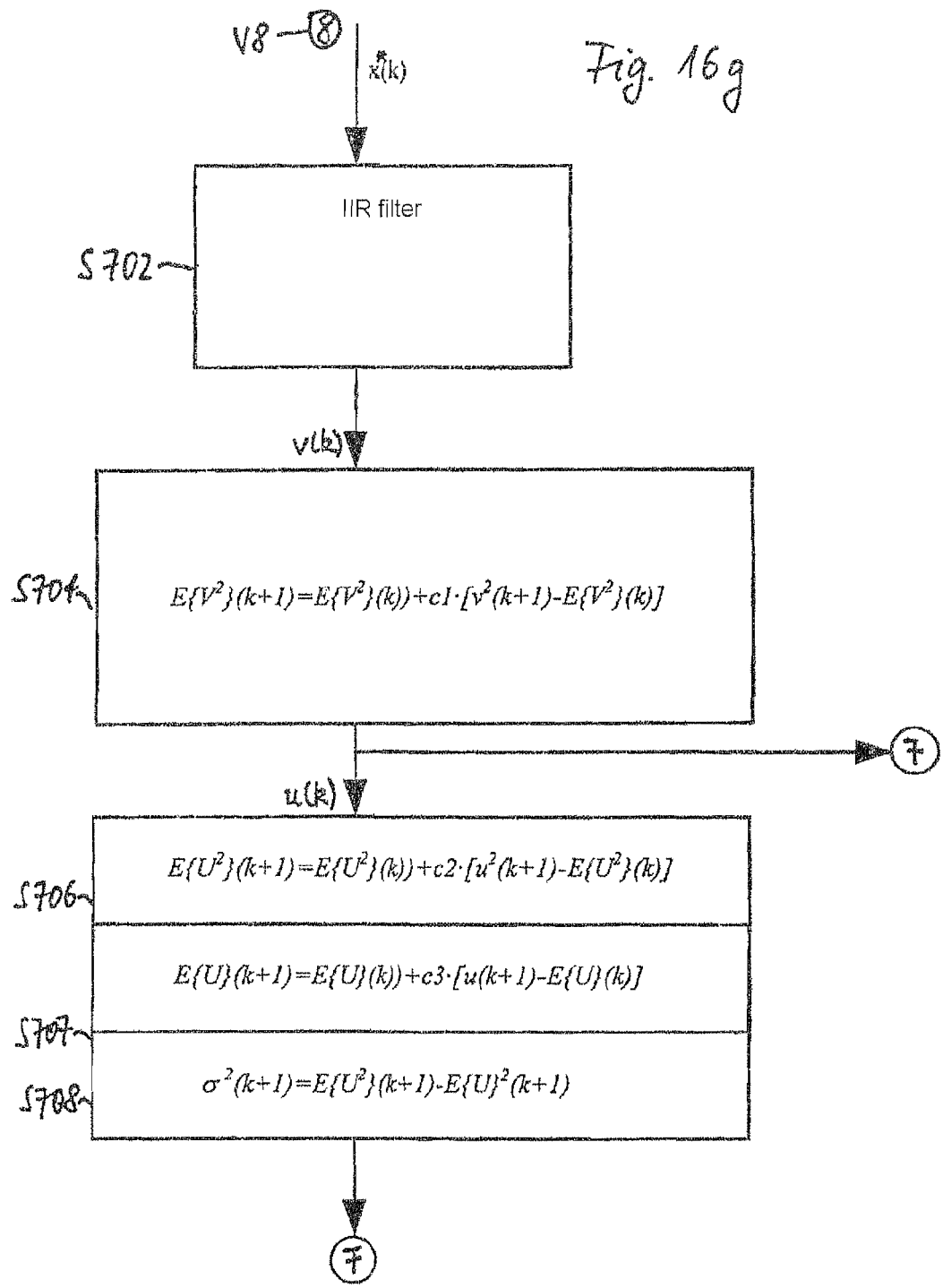

The samples x*(k), x*(k+1), x*(k+2), . . . , abbreviated by x*(k) in FIG. 16g, preferably pass through an IIR high-pass filter 59 at least of the fifth order, the filter coefficients of which are freely programmable, in step S702. This filters out the low-frequency component of the sensor signal 40. At the output of the filter 59, the filter samples v(k), v(k+1), . . . , abbreviated here by v(k), are then present which is shown in FIG. 13. In step S704, the second ordinary statistical moment $E\{V^2\}(k+1)$ for the "new" filter sample v(k+1) is calculated, following equation (5). For this purpose, the second ordinary statistical moment $E\{V^2\}(k)$ for the "old" filter sample v(k) is subtracted from the square $v^2(k+1)$ for the "new" filter sample v(k+1), this difference is multiplied by an adaptation constant c1, and the result of the multiplication is then added to the second ordinary statistical moment $E\{V^2\}(k)$ for the "old" filter sample v(k). For c1, 0<c1<1 applies. This ordinary statistical moment of the second order is shown on the left in FIG. 15. After that, the output signal output can be output as it is as quantitative error signal in step S710, and in addition, the output signal output can be compared with a threshold value in step S718 and, if it exceeds this value, can be output as qualitative value which is designated by "structural sound output flag" in step S720. In addition, a comparison can be made in step S712 whether the output signal output exceeds a maximum output signal Output-max previously detected (which can be arbitrarily deleted by the user), and in step S714 this can then be stored as new maximum output signal Output_max, after which it can be output in step S716 which is designated by "Output_max output flag".

For the further processing, the output values $E\{V^2\}(k+1)$ from the calculation of step S704 are designated by abbreviating to u(k) for reasons of better clarity. In step S706, the calculation of the second ordinary statistical moment, known from step S704, is then carried out, but on the basis of the values u(k) in order to calculate the second ordinary statistical moments $E\{U^2\}(k+1)$ for u(k+1). Instead of the adaptation constant c1 used in step S704, an adaptation constant c2 is used for which 0<c2<1 applies. However, c1=c2 can also apply. In step S707, the expected value $E\{U\}(k+1)$ of u(k+1) is calculated following equation (3). For this purpose, the expected value $E\{U\}(k)$ of u(k) is subtracted from u(k+1), this difference is multiplied by an adaptation constant c3 (for which 0<c3<1 applies) and the result of the multiplication is then added to the expected value $E\{U\}(k)$. c3 does not necessarily need to differ from c1 and/or c2. In step S708, the variance $\sigma^2(k+1)$ is then calculated by subtracting the square of the result of step S707 from the result of step S706. After that, there can be another output (optionally in steps S710 and/or S716 and/or S720) with the aforementioned possibilities, the accuracy of the detection and the distinguishability of sensor signal and of noise being better after steps S706 to S708 than after an output already after step S704.

Thus, the structural sound occurring in the roller bearing 20 is also detected.

It has been found in many investigations that the method according to the invention determines the required operating parameters very reliably and operates optimally for the objective set. Using the equations for the linear expected value and the ordinary statistical moment of second order makes it possible to determine the operating parameters by evaluating the accumulating data in the ASIC fast and reliably in a minimum of space. Among other things, the method is also very efficient because it mainly uses comparisons and additions and no elaborate multiplications or divisions and is built up on simple storage with minimum storage space requirement.

In the above description, it was assumed that the method according to the invention is carried out in an ASIC, that is to say carried out in a hard-wired arrangement. However, it is clear that the method according to the invention can also be carried out in the form of software, i.e. a computer program, in a normal computer.

It must be stated that the features of the invention described with reference to individual embodiments such as, for example, individual steps from the flow diagrams or the description of the theoretical principles of the method can also be present in other embodiments unless otherwise specified or inherently barred for technical reasons.

The invention claimed is:

1. A method for determining operating parameters of a rotating roller bearing, comprising the steps of:
    fixing a sensor arrangement to the roller bearing; and
    generating a sinusoidal signal with the sensor depending on rotational position of the roller bearing, which is sampled at sampling points k, k+1, k+2, . . . , as a result of which samples, x*(k), x*(k+1), x*(k+2), . . . , are determined, where k is an integral as a run variable for elapsed time, wherein
    for determining rotational speed, of rotational direction, of radial force and/or of axial force, the signal at an amplitude of 0µV parallel to an envelope of the signal and is constructed by means of estimation, and the operating parameters are determined on this basis, and/or
    for determining the operating parameters of structural sound events, the samples are filtered in a high-pass filter for obtaining filter samples, v(k), v(k+1), v(k+2), . . . , and occurring structural sound is determined by means of estimation of a statistical moment at least of a second order, $E\{V^2\}(k)$, $E\{V^2\}(k+1)$, $E\{V^2\}(k+2)$, . . ., of the filter samples.

2. The method of claim 1, wherein the rotational speed is determined as operating parameter, comprising the following steps:
    a) establishing a starting value for an estimated value, $E(x^*(k=0))$, as an expected value of the signal for a starting time, k=0, and sampling the signal at the starting time for determining an instantaneous value of the signal as starting sample, x*(0), and subsequent incrementing of a run variable k by 1,
    b) sampling the signal at a time, k+1, for determining the instantaneous value of the signal as (k+1)th sample x*(k+1),
    c) calculating a (k+1)th estimated value, $E(x^*(k+1))$, as sum of the kth estimated value $E(x^*(k))$ and the product of an adaptation quantity c0 with a result of a subtraction of the kth estimated value $E(x^*(k))$ from the (k+1)th sample x*(k+1),
    d) subtracting the (k+1)th estimated value $E(x^*(k+1))$, calculated in step c), from the k+1th sample x*(k+1) determined in step b) and using the difference as (k+1)th computing value x(k+1),
    e) comparing the sign of the (k+1)th computing value x(k+1), calculated in step d), with the sign of the corresponding kth computing value x(k) from the previous run-through of step d),
    f) if the signs compared in step e) are equal: incrementing k by 1 and repeating steps b) to f); otherwise, comparing whether the (k+1)th computing value x(k+1) from the current step d) is greater than the corresponding kth computing value x(k) from the previous run-through of step d),
    g) if it is found in step f) that x(k+1)>x(k): establishing the time at which the sign has changed between the two computing values with unequal signs determined in step e) in this rising direction, and incrementing k by 1 and repeating steps b) to g) until $x(k+1) > x(k)$ is again obtained in step f), otherwise establishing the time at which the sign has changed between the two computing values with unequal signs determined in step e) in this falling direction, and incrementing k by 1 and repeating steps b) to g) until it is found in turn that $x(k+1) > x(k)$ does not apply in step f), and h) forming the difference between the times determined in the different run-throughs in step g) and outputting of this difference as a value which corresponds to the rotational speed of the roller bearing and preferably continuing the method from step b), wherein $0 < c0 < 1$ applies to c0.

3. The method as claimed in claim 2, wherein the times established in different run-throughs in step g) are determined by interpolation between two computing values with unequal sign from step f).

4. The method of claim 1, wherein the axial force is determined as operating parameter and wherein the sensor arrangement is designed in such a manner that the sinusoidal signal changes when an axial force is present at the roller bearing, comprising the following steps:

a) establishing a starting value for an estimated value, $E(x^*(k+0))$, as expected an value of the signal for a starting time, $k=0$, and sampling the signal at the starting time for determining an instantaneous value of the signal as a starting sample, $x^*(0)$, and subsequent incrementing of a run variable k by 1, b) sampling the signal at a time, $k+1$, for determining the instantaneous value of the signal as $(k+1)$th sample $x^*(k+1)$, c) calculating a $(k+1)$th estimated value $E(x^*(k+1))$ as the sum of the kth estimated value $E(x^*(k))$ and the product of an adaptation quantity c0 with the result of a subtraction of the kth estimated value $E(x^*(k))$ from the $(k+1)$th sample $x^*(k+1)$ d1) subtracting the $(k+1)$th estimated value $E(x^*(k+1))$, calculated in step c), from the $k+1$th sample $x^*(k+1)$ determined in step b) and adding an auxiliary variable (dev-aux) and using the result as $(k+1)$th computing value $x(k+1)$, e1) comparing the sign of the $(k+1)$th computing value $x(k+1)$ calculated in step d1) with the sign of the corresponding kth computing value $x(k)$ from the previous run-through of step d1), f1) if the signs compared in step e1) are equal: incrementing k by 1 and repeating steps b) to f1); otherwise, comparing whether the $(k+1)$th computing value $x(k+1)$ from the current step d1) is greater than the corresponding kth computing value $x(k)$ from the previous run-through of step d1), g1) if it is found in step f1) that $x(k+1) > x(k)$: establishing the time at which the sign has changed between the two computing values with unequal signs determined in step e1) in this rising direction, and incrementing k by 1 and repeating steps b) to g1) until $x(k+1) > x(k)$ is again obtained in step f1), otherwise establishing the time at which the sign has changed between the two computing values with unequal signs determined in step e1) in this falling direction, and incrementing k by 1 and repeating steps b) to g1) until it is in turn found that $x(k+1) > x(k)$ does not apply in step f1), i1) subtracting the time established in step g1) in the second alternative from the time established in step g1) in the first alternative and using the difference as time interval of the negative half cycle, d2) subtracting the $(k+1)$th estimated value $E(x^*(k+1))$ calculated in step c) and the auxiliary variable (dev-aux) from the $k+1$th sample $x^*(k+1)$ determined in step b) and using the result as $(k+1)$th computing value $y(k+1)$, e2) comparing the sign of the $(k+1)$th computing value $y(k+1)$, calculated in step d2), with the sign of the corresponding kth computing value $y(k)$ from the previous run-through of step d2), f2) if the signs compared in step e2) are equal: incrementing k by 1 and repeating steps b) to f2); otherwise, comparing whether the $(k+1)$th computing value $y(k+1)$ from the current step d2) is greater than the corresponding kth computing value $y(k)$ from the previous run-through of step d2), g2) if the result in step f2) is $y(k+1) > y(k)$: establishing the time at which the sign has changed between the two computing values with unequal signs, determined in step e2) in this rising direction, and incrementing k by 1 and repeating steps b) to g2) until $y(k+1) > y(k)$ is again obtained in step f2); otherwise establishing the time at which the sign has changed between the two computing values with unequal signs determined in step e2) in this falling direction, and incrementing k by 1 and repeating steps b) to g2) until it is in turn found that $y(k+1) > y(k)$ does not apply in step f2), i2) subtracting the time established in step g2) in the first alternative from the time established in step g2) in the second alternative and using the difference as time interval of the positive half cycle, wherein steps d2) to i2) occur preferably as far as possible in parallel with steps d1) to i1), and j) forming the difference between the time intervals determined in steps i1) and i2) and outputting the sign of this difference as a value which corresponds to the direction of the axial force acting on the roller bearing, and preferably continuing the method from step b), wherein $0 < c0 < 1$ applies to c0.

5. The method as claimed in claim 4, wherein the times established in steps g1) and g2) are determined by interpolation between the respective two computing values with unequal sign from steps f1) and f2), respectively.

6. The method of claim 4, wherein a calculation of the amount of the difference, formed in step j), is carried out as measure of the magnitude of the axial force and is output.

7. The method of claim 1 wherein the radial force is determined as operating parameter, comprising the following steps:

a) establishing a starting value for the estimated value $E(x^*(k=0))$ as expected value of the signal for a starting time $k=0$ and sampling the signal at time $k=0$ for determining its instantaneous value as starting sample $x^*(0)$ and subsequent incrementing of the run variable k by 1, b) sampling the signal at time $k+1$ for determining its instantaneous value as $(k+1)$th sample $x^*(k+1)$, c) calculating a $(k+1)$th estimated value $L(x^*(k+1))$ as sum of the kth estimated value $E(x^*(k))$ and the product of an adaptation quantity c0 with the result of a subtraction of the kth estimated value $E(x^*(k))$ from the $(k+1)$th sample $x^*(k+1)$, d) subtracting the $(k+1)$th estimated value $E(x^*(k+1))$, calculated in step c), from the $K+1$th sample $x^*(k+1)$ determined in step b) and using the difference as $(k+1)$th computing value $x(k+1)$, e) comparing the sign of the (k+1)th computing value x(k+1), calculated in step d), with the sign of the corresponding kth computing value x(k) from the previous run-through of step d), k) if the signs compared in step e) are equal: checking whether the sign of the (k+1)th computing value x(k+1) from step d) is positive and if a positive sign is obtained: repeating steps b) to k) until an unequal sign is detected in step e), and storing the maximum ($max_{13}$value) of the (k+1)th computing values x(k+) hitherto calculated in step d), otherwise repeating steps b) to k) until an unequal sign is detected in step e), and storing the minimum of the (k+1)th computing values x(k+1) hitherto calculated in step d) and calculating the difference (dev) between the maximum and the minimum of these (k+1)th computing values x(k+1) calculated in step d) and outputting this difference (dev) as a value which corresponds to the radial force acting on the roller bearing, and preferably incrementing k by 1 and continuing the method from step b); if the signs compared in step e) are unequal: resetting the maximum or the minimum, respectively, of the (k+1)th computing values x(k+1), calculated in step d), to 0 and incrementing k by 1 and continuing the method with step b), wherein 0>c0>1 applies to c0.

8. The method of claim 7, wherein in step k), for a positive sign, a check is made whether the (k+1)th computing value x(k+1) of step d) is greater than the previously determined maximum and if this is so: storing this (k+1)th computing value x(k+1) as new maximum for the calculation of the difference, and for a negative sign, a check is made whether the (k+1)th computing value x(k+1) of step d) is smaller than the previously determined minimum, and if this is so: storing this (k+1)th computing value x(k+1) as new minimum for calculating the difference.

9. The method of claim 7, wherein the first run-through of step k), the difference is additionally stored as maximum difference and with each run-through of step k), a comparison is made whether the value of the currently calculated difference is greater than the maximum difference, and if this is so: storing this currently calculated difference as new maximum difference which can be deleted by a user.

10. The method of claim 1, wherein the rotational direction is determined as operating parameter and the sensor arrangement is designed in such a manner that the sinusoidal signal is different for different directions of rotation, comprising the following steps:

a) establishing a starting value for the estimated value E(x*(k=0)) as expected value of the signal for a starting time k=0 and sampling the signal at time k=0 for determining its instantaneous value as starting sample x*(0) and subsequent incrementing of the run variable k by 1, b) sampling the signal at time k+1 for determining its instantaneous value as (k+1)th sample x*(k+1), c) calculating a (k+1)th estimated value E(x*(k+1)) as the sum of the kth estimated value E(x*(k)) and the product of an adaptation quantity c0 with the result of a subtraction of the kth estimated value E(x*(k)) from the (k+1)th sample x*(k+1), d) subtracting the (k+1)th estimated value E(x*(k+1)), calculated in step c), from the K+1 th sample x*(k+1) determined in step b) and using the difference as (k+1)th computing value x(k+1), e) comparing the sign of the (k+1)th computing value x(k+1), calculated in step d), with the sign of the corresponding kth computing value x(k) from the previous run-through of step d), l) if the signs compared in step e) are equal: checking whether the sign of the (k+1)th computing value x(k+1) of step d) is positive, and if a positive sign is obtained: repeating steps b) to l) until an unequal sign is detected in step e), and storing the time of the occurrence of the maximum of the (k+1)th computing values x(k+1) hitherto calculated in step d), otherwise repeating steps b) to l) until an unequal sign is detected in step e), and storing the time of the occurrence of the minimum of the (k+1)th computing values x(k+1) hitherto calculated in step d), and incrementing k by 1 and continuing the method from step b), if the signs compared in step e) are unequal:

m) evaluating the temporal relationship of the time of the occurrence of the maximum of the (k+1)th computing values x(k+1) hitherto calculated in step d) and of the time of the occurrence of the minimum of the (k+1)th computing values x(k+1) hitherto calculated in step d) relative to one another for determining the rotational direction of the roller bearing and outputting it, and incrementing k by 1 and continuing the method with step b), wherein 0<c0<1 applies to c0.

11. The method of claim 10, wherein step m) contains a comparison whether the (k+1)th computing value x(k+1) from the current step d) is greater than the corresponding kth computing value x(k) from the previous run-through of step d), and comprises the following step:

n) if the comparison in step m) is positive: subtracting a minimum auxiliary variable from the time of the occurrence of the minimum of the (k+1)th computing values x(k+1) hitherto calculated in step d), dividing the result by 2, adding the minimum auxiliary variables to this and subtracting the time of the occurrence of the maximum of the (k+1)th computing values x(k+1) hitherto calculated in step d) from this and subsequently determining the sign (sym) of the result, then taking over the time of the occurrence of the minimum of the (k+1)th computing values x(k+1), hitherto calculated in step d), as new minimum auxiliary variable and outputting this sign as a value which corresponds to the rotational direction of the roller bearing, and incrementing k by 1 and continuing the method with step b); otherwise: subtracting a maximum auxiliary variable from the time of the occurrence of the maximum of the (k+1)th computing values x(k+1) hitherto calculated in step d), dividing the result by 2, adding the maximum auxiliary variable to this and subtracting the time of the occurrence of the minimum of the (k+1)th computing values x(k+1) hitherto calculated in step d) from this and subsequently determining the sign of the result, then taking over the time of the occurrence of the maximum of the (k+1)th computing values x(k+1), hitherto calculated in step d), as new maximum auxiliary variable and outputting this sign as a value which corresponds to the rotational direction of the roller bearing, and incrementing k by 1 and continuing the method from step b).

12. The method of claim 10 wherein step l), for a positive sign, a check is made whether the (k+1)th computing value x(k+1) from step d) is greater than the previously determined maximum, and if this is so: storing the time of the occurrence of this (k+1)th computing value x(k+1), and for a negative sign, a check is made whether the (k+1)th computing value x(k+1) of step d) is smaller than the previously determined minimum, and if this is so: storing the time of the occurrence of the minimum of this (k+1)th computing value x(k+1).

13. The method of claim 1, wherein structural sound events which act on the rotating roller bearing are determined as operating parameter, comprising the following steps:
   o) sampling the signal at time k=0 for determining its instantaneous value as starting sample x*(0),
   p) filtering the starting sample x*(0) obtained in step o) in a high-pass filter for obtaining a filter sample v(k=0),
   q) establishing the second ordinary statistical moment $E\{V^2\}(k=0)$ of the filter sample v(k=0) as moment starting value and subsequent incrementing of the run variable k by 1,
   b) sampling the signal at time k+1 for determining its instantaneous value as (k+1)th sample x*(k+1),
   r) filtering the sample x*(k+1) obtained in step b) in a high-pass filter for obtaining a filter sample v(k+1),
   s) calculating the second ordinary statistical moment $u(k)=E\{V^2\}(k+1)$ for the filter sample v(k+1) as sum of the second ordinary statistical moment $E\{V^2\}(k)$ for the filter sample v(k) and the value of the result, multiplied by an adaptation quantity c1, of the subtraction of this second ordinary statistical moment $E\{V^2\}(k)$ from the square $v^2(k+1)$ of the filter sample v(k+1), and
   t) outputting a corresponding qualitative error signal or outputting a corresponding quantitative error value and continuing the method from step b),
   wherein 0<c1<1 applies to c1.

14. The method of claim 13, wherein the following steps are carried out between steps s) and t):
   u) calculating the second ordinary statistical moment $E\{U^2\}(k+1)$ for u(k+1) as sum of an expected value of the second order $E\{U^2\}(k)$ of u(k) and the value of the result, multiplied by an adaptation quantity c2, of the subtraction of the second ordinary statistical moment $E\{U^2\}(k)$ from the square $u^2(k+1)$ of the second ordinary statistical moment u(k+1),
   v) calculating the expected value $E\{U\}(k+1)$ of u(k+1) as the sum of the expected value $E\{U\}(k)$ of u(k) and the value of the result, multiplied by an adaptation quantity c3, of the subtraction of the expected value $E\{U\}(k)$ from the second ordinary statistical moment u(k+1), and
   w) calculating the variance $\sigma^2(k+1)$ as a value of the result of the subtraction of the square of the result of step v) from the result of step u),
   wherein 0<c2<, 0<c3<1 applies to c2 and c3.

15. The method of claim 14, wherein step s) is skipped and the filter sample v(k) is used instead of the second ordinary statistical moment u(k).

16. The method of claim 13, wherein a maximum of the quantitative error signal or the quantitative error value from step t) is stored as a maximum error value.

17. The method of claim 2, wherein one or more adaptation quantities are selected as a constant for minimizing computing effort or are selected as a dynamic variable for maximizing computing accuracy, computing speed and/or computing stability.

18. The method of claim 4, wherein for determination of a number of operating parameters, steps which are designated by same letters do not need to be carried out repeatedly.

19. A computer program product for determining rotational speed of a roller bearing, which comprises:
   a sensor arrangement fixed to the roller bearing, which, on rotation of the roller bearing, delivers a sinusoidal signal depending on rotational position,
   wherein the computer program contains a means for determining operating parameters of the roller bearing, comprising the steps of:
   fixing a sensor arrangement to the roller bearing; and
   generating a sinusoidal signal with the sensor depending on rotational position of the roller bearing, which is sampled at sampling points k, k+1, k+2, ..., as a result of which samples x*(k) x*(k+1) x*(k+2), ... are determined, where k is an integral as a run variable for elapsed time, wherein
      for determining rotational speed, rotational direction, radial force and/or axial force, an artificial line, which intersects the signal and is parallel to an envelope of the signal, is constructed by means of estimation and the operating parameters are determined on this basis, and/or
      for determining the operating parameters of structural sound events, the samples are filtered in a high-pass filter for obtaining filter samples, v(k), v(k+1), v(k+2), ..., and occurring structural sound is determined by means of estimation of a statistical moment at least of a second order, $E\{V^2\}(k)$, $E\{V^2\}(k+1)$, $E\{V^2\}(k+2)$, ..., of the filter samples.

20. A roller bearing with z roll bodies, wherein z is an integral number, and with a device for determining operating parameters of the roller bearing, comprising:
   at least one sensor arrangement fixed to the roller bearing and arranged in a circumferential direction of the roller bearing,
   wherein each sensor arrangement, on rotation of the roller bearing, delivers a sinusoidal signal depending on a rotational position of each sensor arrangement, and at least one, evaluating device,
   wherein each evaluating device is connected to one sensor arrangement each,
   wherein each evaluating device contains an evaluating unit for carrying out the steps according to a method for determining operating parameters of a rotating roller bearing, comprising the steps of:
   fixing a sensor arrangement to the roller bearing; and
   generating a sinusoidal signal with the sensor depending on rotational position of the roller bearing, which is sampled at sampling points k, k+1, k+2, ..., as a result of which samples x*(k), x*(k+1) x*(k+2), ... are determined, where k is an integral as a run variable for elapsed time, wherein
      for determining rotational speed, rotational direction, radial force and/or axial force, an artificial line, which intersects the signal and is parallel to an envelope of the signal, is constructed by means of estimation and the operating parameters are determined on this basis, and/or
      for determining the operating parameters of structural sound events, the samples are filtered in a high-pass filter for obtaining Filter samples, v(k), v(k+1), v(k+2), ..., and occurring structural sound is determined by means of estimation of a statistical moment at least of a second order, $E\{V^2\}(k)$, $E\{V^2\}(k+1)$, $E\{V^2\}(k+2)$, ..., of the filter samples.

21. The roller bearing of claim 20, wherein each sensor arrangement is formed from four strain gauges, interconnected to form a Wheatstone bridge, which are arranged behind one another in the circumferential direction of the roller bearing, the four strain gauges being a first strain gauge, a second strain gauge, a third strain gauge and a forth strain gauge,
   wherein the first strain gauge and the third strain gauge of each sensor arrangement and the second strain gauge and the fourth strain gauge of each sensor arrangement exhibit n-times a distance between two adjacent roller bodies from one another in the circumferential direction, or formed from two strain gauges, interconnected to form, in each case, one Wheatstone half bridge, which are arranged behind one another in the circumferential direction of the roller bearing, wherein the signal is generated by the roller bodies rolling over the strain gauges and n is an integral number greater than or equal to 1.

22. The roller bearing of claim 21, wherein each strain gauge and at least one evaluating device are arranged in a circumferential outer slot of the outer ring of an roller bearing.

23. The roller bearing of claim 20, wherein each evaluating unit and each evaluating device is constricted as an electrical circuit.

24. The roller bearing of claim 23, wherein the electrical circuit is ASIC.

* * * * *